United States Patent
McQuilkin et al.

(10) Patent No.: US 10,946,907 B2
(45) Date of Patent: Mar. 16, 2021

(54) AERODYNAMIC CURTAIN ASSEMBLY FOR A TANK TRAILER

(71) Applicant: Tank Trailer Technologies LLC, Morris, IL (US)

(72) Inventors: Scot McQuilkin, Homer Glen, IL (US); David Moore, Ottawa, IL (US); Mark R. Holden, West Lafayette, IN (US)

(73) Assignee: Tank Trailer Technologies LLC, Morris, IL (US)

( * ) Notice: Subject to any disclaimer, the term of this patent is extended or adjusted under 35 U.S.C. 154(b) by 92 days.

(21) Appl. No.: 16/440,521

(22) Filed: Jun. 13, 2019

(65) Prior Publication Data

US 2019/0382058 A1    Dec. 19, 2019

Related U.S. Application Data

(60) Provisional application No. 62/685,065, filed on Jun. 14, 2018.

(51) Int. Cl.
  *B62D 35/00* (2006.01)
  *B60P 3/22* (2006.01)
  *B62D 53/06* (2006.01)

(52) U.S. Cl.
  CPC ............ *B62D 35/001* (2013.01); *B60P 3/226* (2013.01); *B60P 3/2215* (2013.01); *B62D 53/06* (2013.01)

(58) Field of Classification Search
  CPC ....... B62D 35/001; B62D 53/06; B60P 3/226; B60P 3/32215
  USPC .................................................... 296/180.4
  See application file for complete search history.

(56) References Cited

U.S. PATENT DOCUMENTS

| 2,056,179 | A |   | 10/1936 | Fitch |            |
|-----------|---|---|---------|-------|------------|
| 3,016,623 | A |   | 1/1962  | Wallace |          |
| 3,311,269 | A | * | 3/1967  | Mendez ................ B60P 1/60 |
|           |   |   |         |       | 222/626    |

(Continued)

FOREIGN PATENT DOCUMENTS

WO    WO 2015191472    12/2015

OTHER PUBLICATIONS

Lawrence Livermore National Laboratory, DOE's Effort to Improve Heavy Vehicle Fuel Efficiency through Improved Aerodynamics, DOE Annual Merit Review, Project ID #VSS006, Jun. 8, 2015, retrieved from https://energy.gov/sites/prod/files/2015/07/24/vss006_salari_2015_0.pdf.

(Continued)

*Primary Examiner* — Joseph D. Pape
(74) *Attorney, Agent, or Firm* — Faegre Drinker Biddle & Reath LLP

(57) ABSTRACT

An aerodynamic curtain assembly for use with a tank trailer illustratively includes a front nose assembly, and opposing first and second side assemblies. The front nose assembly illustratively includes a front support coupled to the tank trailer, and a flexible air deflector screen coupled to the support and extending arcuately from a first upright supported by a first side of the tank trailer to a second upright supported by a second side of the tank trailer. Each of the side assemblies illustratively includes an upper support member, a lower support member, an upper coupler securing the upper end of a flexible air deflector screen to the upper support member, and a lower coupler securing the lower end of the flexible air deflector screen to the lower support member.

39 Claims, 36 Drawing Sheets

(56) References Cited

U.S. PATENT DOCUMENTS

| | | |
|---|---|---|
| 4,402,544 A | 9/1983 | Artim et al. |
| 4,528,188 A | 5/1985 | Witten |
| 4,668,007 A | 5/1987 | Sloan |
| 4,966,407 A | 10/1990 | Lusk |
| 5,058,946 A | 10/1991 | Faber |
| 6,092,856 A | 7/2000 | Ladensack |
| 6,224,141 B1 | 5/2001 | Brodlo |
| 6,932,419 B1 | 8/2005 | McCullough |
| 7,380,868 B2 | 6/2008 | Breidenbach |
| 8,186,745 B2 | 5/2012 | Graham et al. |
| 8,573,680 B2 | 11/2013 | Smith |
| 8,651,547 B2 | 2/2014 | Gallego |
| 8,845,008 B1 | 9/2014 | Mariorana et al. |
| 9,090,294 B2 | 7/2015 | Johnson |
| 9,126,638 B2 | 9/2015 | Breidenbach |
| 9,162,716 B2 | 10/2015 | Nusbaum |
| 9,493,197 B2 | 11/2016 | Logounov |
| 9,527,534 B2 | 12/2016 | Knobloch |
| 9,545,960 B2 | 1/2017 | Smith et al. |
| 9,789,916 B1 | 10/2017 | Beelman, III |
| 2008/0303311 A1 | 12/2008 | Roush |
| 2009/0212594 A1 | 8/2009 | Breidenbach |
| 2011/0084516 A1 | 4/2011 | Smith |
| 2011/0109121 A1 | 5/2011 | Salari et al. |
| 2012/0126573 A1* | 5/2012 | Minbiole .............. B62D 35/001 296/180.2 |
| 2013/0057020 A1 | 3/2013 | Burrell |
| 2013/0127203 A1* | 5/2013 | Johnson ................ B62D 35/02 296/180.4 |
| 2014/0125088 A1 | 5/2014 | Wiegel |
| 2015/0007436 A1 | 1/2015 | Kibler |
| 2015/0061318 A1 | 3/2015 | Kibler |
| 2015/0137501 A1 | 5/2015 | Kibler |
| 2017/0029044 A1 | 2/2017 | Senatro |
| 2017/0129549 A1 | 5/2017 | Polgrean |
| 2018/0362100 A1 | 12/2018 | Maiorana |
| 2019/0106162 A1 | 4/2019 | Holden |

OTHER PUBLICATIONS

Fleet Equipment, Investing in Aerodynamics to Improve Fuel Efficiency, Mar. 23, 2015, retrieved from http://www.fleetequipmentmag.com/truck-trailer-aerodynamics-fuel-efficiency/; see also http://www.slate.com/blogs/probeat/2013/04/03/truck_panels_what_do_they_do_explained_photos.html; see also http://www.stemco.com/product/trailertail/.

* cited by examiner

AERODYNAMIC CURTAIN ASSEMBLY FOR A TANK TRAILER

CROSS-REFERENCE TO RELATED APPLICATION

The present application claims priority to U.S. Provisional Patent Application Ser. No. 62/685,065, filed Jun. 14, 2018, the disclosure of which is expressly incorporated herein by reference.

BACKGROUND AND SUMMARY OF THE DISCLOSURE

The present disclosure relates generally to an air deflector for a vehicle and, more particularly, to a curtain for promoting aerodynamics and preventing air drag on a conventional tank trailer.

Air or aerodynamic deflectors on vehicles, including trailers, are known to reduce wind drag and thereby increase fuel efficiency. While a variety of different aerodynamic deflectors have been used on cabs and conventional trailers to reduce air drag, there has been little effort directed specifically to improve the aerodynamics of tank trailers. More particularly, tank trailers typically include components and associated surfaces that increase air drag compared to other types of conventional trailers (e.g., flat bed trailers and enclosed trailers). For example, conventional tank trailers include a tank having a plurality of silos and associated piping components that increase air drag. As such, there remains a need for air deflectors that improve aerodynamics of tank trailers.

According to an illustrative embodiment of the present disclosure, an aerodynamic curtain assembly for a tank trailer includes a front nose assembly having a front support coupled to the tank trailer, and a flexible front air deflector screen coupled to the front support and extending arcuately from a first upright supported by a first side of the tank trailer to a second upright supported by a second side of the tank trailer. A first side assembly is supported adjacent to the first side of the tank trailer, and a second side assembly is supported adjacent to the second side of the tank trailer. The first side assembly and the second side assembly each include an upper support member extending longitudinally along one of the first side and the second side of the tank trailer, and a lower support member extending longitudinally along the one of the first side and the second side of the tank trailer below the upper support member. A flexible side air deflector screen includes an upper end and a lower end. An upper coupler secures the upper end of the flexible side air deflector screen to the upper support member, and a lower coupler secures the lower end of the flexible side air deflector screen to the lower support member.

According to another illustrative embodiment of the present disclosure, an aerodynamic curtain assembly for a tank trailer includes a first side assembly positioned adjacent a first side of a tank trailer, and a second side assembly supported adjacent a second side of the tank trailer. The first side assembly and the second side assembly each includes an upper support member extending longitudinally along one of the first side and the second side of the tank trailer, and a lower support member extending longitudinally along the one of the first side and the second side of the tank trailer below the upper support member. A flexible side air deflector screen includes an upper end and a lower end, an upper coupler secures the upper end of the flexible side air deflector screen to the upper support member, and a lower coupler secures the lower end of the flexible side air deflector screen to a lower support member. A tail support is coupled to the first side assembly and the second side assembly. The tail support includes a first tail frame and a second tail frame laterally spaced apart from the first tail frame. The first tail frame supports a rear end of the flexible side air deflector screen of the first side assembly, and the second tail frame supports a rear end of the flexible side air deflector screen of the second side assembly.

According to a further illustrative embodiment of the present disclosure, a tank trailer includes a frame extending longitudinally between a front end and a rear end, a tank supported by the frame, the tank including a first side and a second side, a plurality of valves supported by the frame below the tank, and an inlet supported proximate the front end of the frame. An aerodynamic curtain assembly includes a front nose assembly including a front support coupled to the tank trailer, and a flexible front air deflector screen coupled to the support and extending arcuately from a first upright supported by a first side of the tank trailer to a second upright supported by a second side of the tank trailer. The inlet is positioned intermediate the front nose assembly and the tank. A first side assembly is supported adjacent the first side of the tank trailer, and a second side assembly is supported adjacent the second side of the tank trailer. The first side assembly and the second side assembly each includes a longitudinally extending upper support member, a longitudinally extending lower support member positioned below the upper support member, and a flexible side air deflector screen including an upper end and a lower end. Each of the first side assembly and the second side assembly further includes an upper coupler securing the upper end of the flexible side air deflector screen to the upper support member, and a lower coupler securing the lower end of the flexible side air deflector screen to the lower support member.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Various embodiments of the invention described herein are not intended to be exhaustive or to limit the invention to precise forms disclosed. Rather, the embodiments selected for description have been chosen to enable one skilled in the art to practice the invention.

Figure 1A:
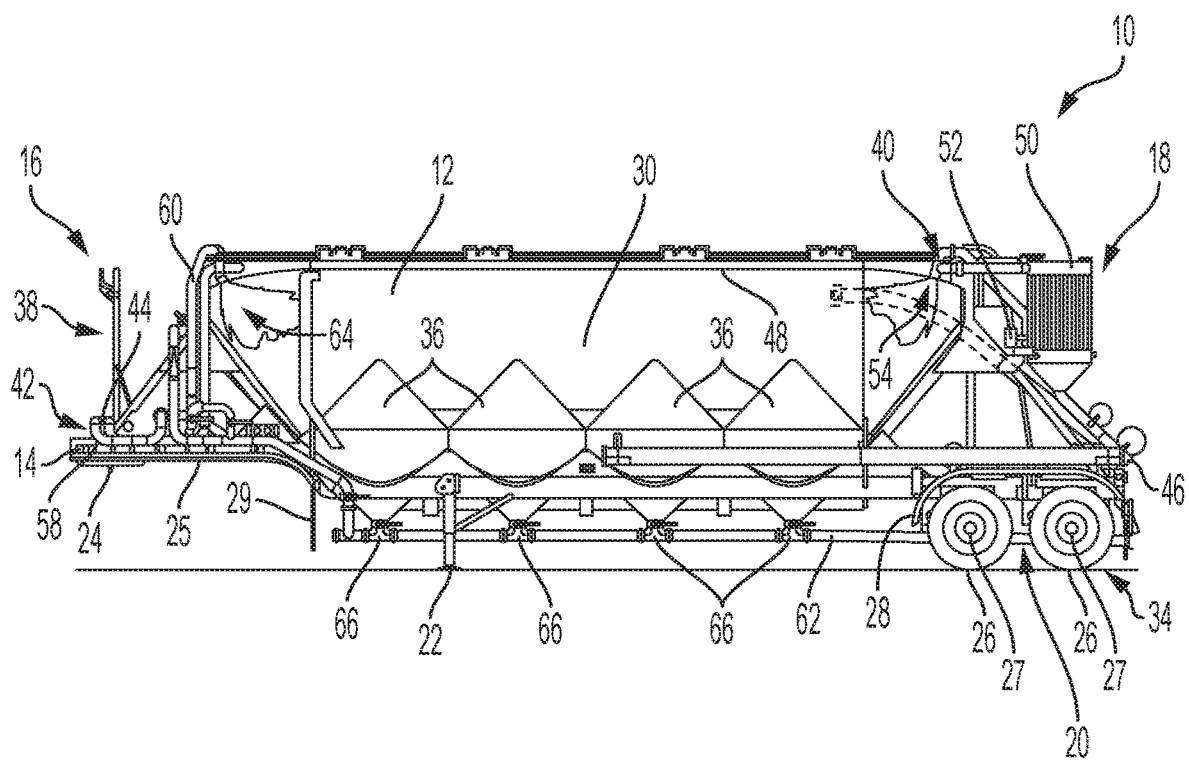
FIG. 1A is a side elevational view of a conventional tank trailer.
Figure 1B:
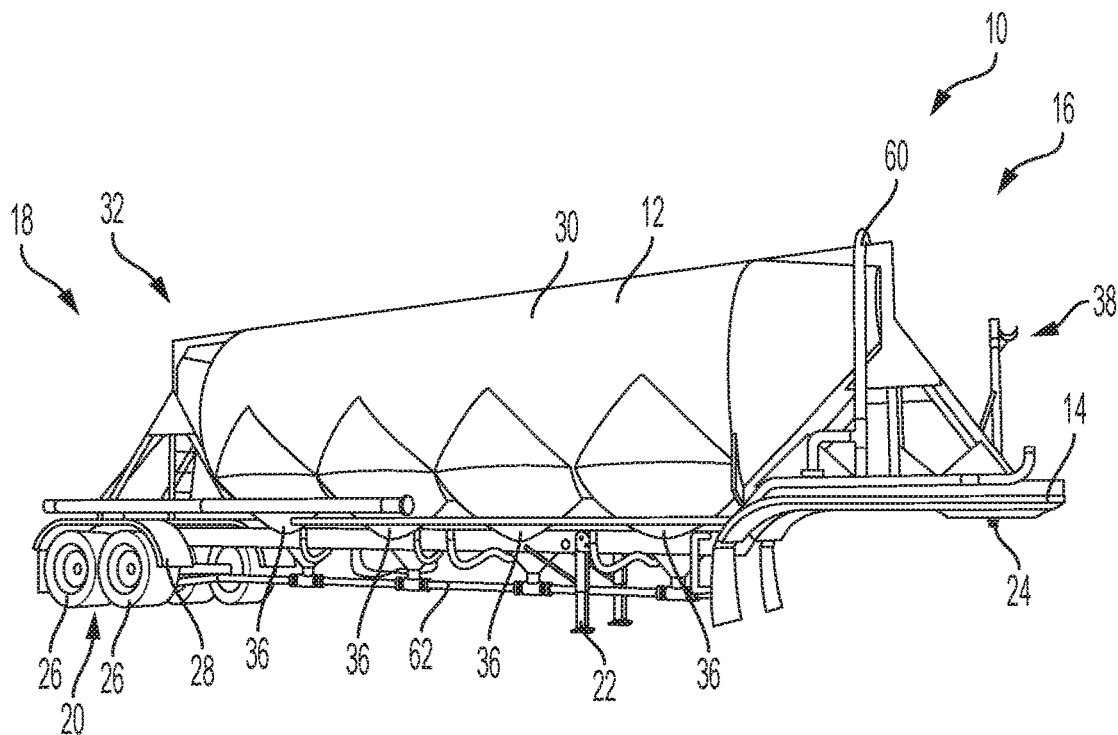
FIG. 1B is a perspective view of the conventional tank trailer of FIG. 1A.

Referring initially to FIGS. 1A and 1B, a conventional tank trailer 10 illustratively comprises self-loading vacuum pneumatic trailer for loading, transporting and unloading material. More particularly, the illustrative tank trailer 10 includes a tank or hopper 12 supported by a frame 14. The frame 14 extends longitudinally between a front or proximal end 16 and a rear or distal end 18. A rear suspension or wheel assembly 20 supports the rear end 18 of the frame 14, and a retractable landing gear or dolly leg 22 may support the front end 16 of the frame 14 when the tank trailer 10 is uncoupled from a pulling vehicle, illustratively a tractor cab (not shown). A conventional receiver 24 is supported proximate the front end 16 of the frame 14 by a coupling platform 25, and is configured to receive a hitch of the pulling vehicle.

More particularly, a front suspension or wheel assembly defined by the pulling vehicle supports the front end 16 of the frame 14. In the illustrative embodiment, the front wheel assembly includes a plurality of wheels rotatably supported by transverse axles, and is positioned below the coupling platform 25. Debris shields or mud flaps 29 are illustratively supported by the frame 14 rearward of the platform 25 and the front wheel assembly. The rear suspension or rear wheel assembly 20 illustratively includes a plurality of wheels 26 rotatably supported by transverse axles 27, and fenders 28 supported above the wheels 26.

Figure 6:
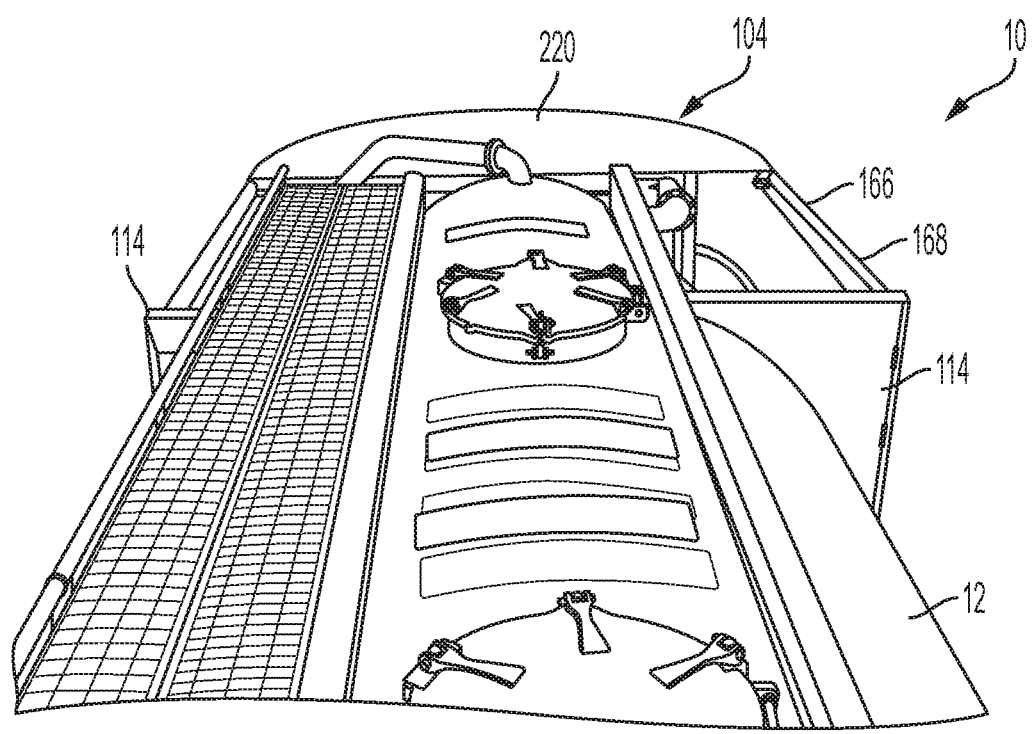
FIG. 6 is a front top perspective view of the tank trailer and aerodynamic curtain of FIG. 2.

The tank 12 illustratively includes a substantially cylindrically shaped main body 30, and includes a first or right side 32 and a second or left side 34 (FIGS. 1A, 1B and 6). The tank 12 is illustratively of conventional design and is configured to receive, store and discharge a fluid or granular material (i.e., liquid or drybulk). For example, the tank 12 may receive, store and discharge a particulate, such as plastic pellets. A plurality of storage portions or silos 36 couple the main body 30 to a piping system 38, including a vacuum system 40 and a pressure system 42 (FIG. 1A).

With further reference to FIG. 1A, the vacuum system 40 is configured to load material into the tank 12. The vacuum system 40 illustratively includes a vacuum connection or inlet 44, a material intake 46, and piping 48 operably (e.g., fluidly) coupled to the inlet 44 and the intake 46. The piping 48 illustratively extends along an upper portion of the tank 12, and is operably (i.e., fluidly) coupled to a self-cleaning vacuum loading filter 50 located proximate the rear end 18 of the frame 14. The filter 50 is operably coupled to an air operated vacuum control valve 52. The material intake 46 is illustratively positioned at the rear end 18 of the trailer frame 14 below the filter 50. A material outlet or discharge 54 is illustratively positioned within an upper portion of the tank 12.

The pressure system 42 is configured to offload or discharge material from the tank 12. The pressure system 42 illustratively includes a pressure connection or inlet 58 operably (e.g., fluidly) coupled to upper (top air line) piping 60 and/or lower (bottom air line) piping 62. The upper piping 60 extends upwardly to an upper portion of the tank 12, and the lower piping 62 extends below the frame 14 and is operably coupled to the tank 12 to deliver material therefrom. A pressure outlet 64 is illustratively positioned in an upper portion of the tank 12. A plurality of discharge fixtures 66 (illustratively valves or knuckles) are supported below each silo 36 and operably (e.g., fluidly) coupled to the piping system 38. Pressure from the outlet 64 forces material out of the tank 12 and through the opened discharge fixtures 66. Control devices (e.g., handles) may be supported by the frame 14 and are operably coupled to the fixtures 66.

Figure 2:
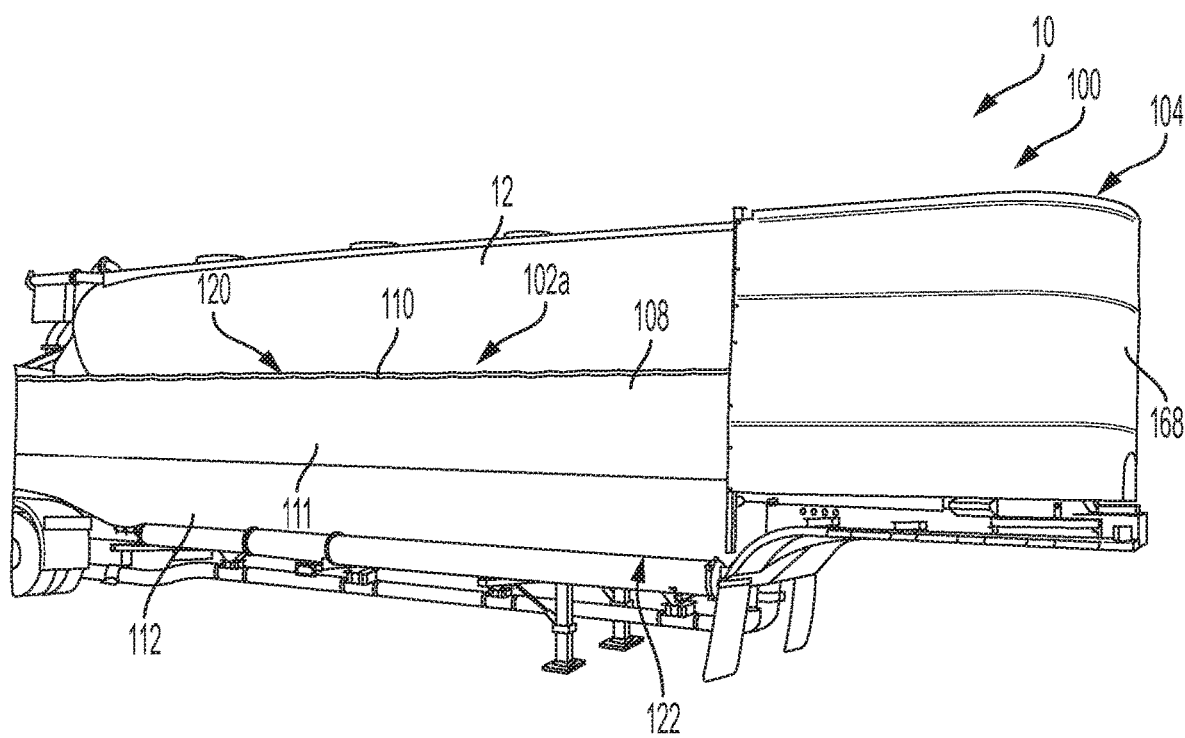
FIG. 2 is a front perspective view of the right side of the tank trailer of FIG. 1, showing an illustrative aerodynamic curtain of the present disclosure coupled thereto.
Figure 3:
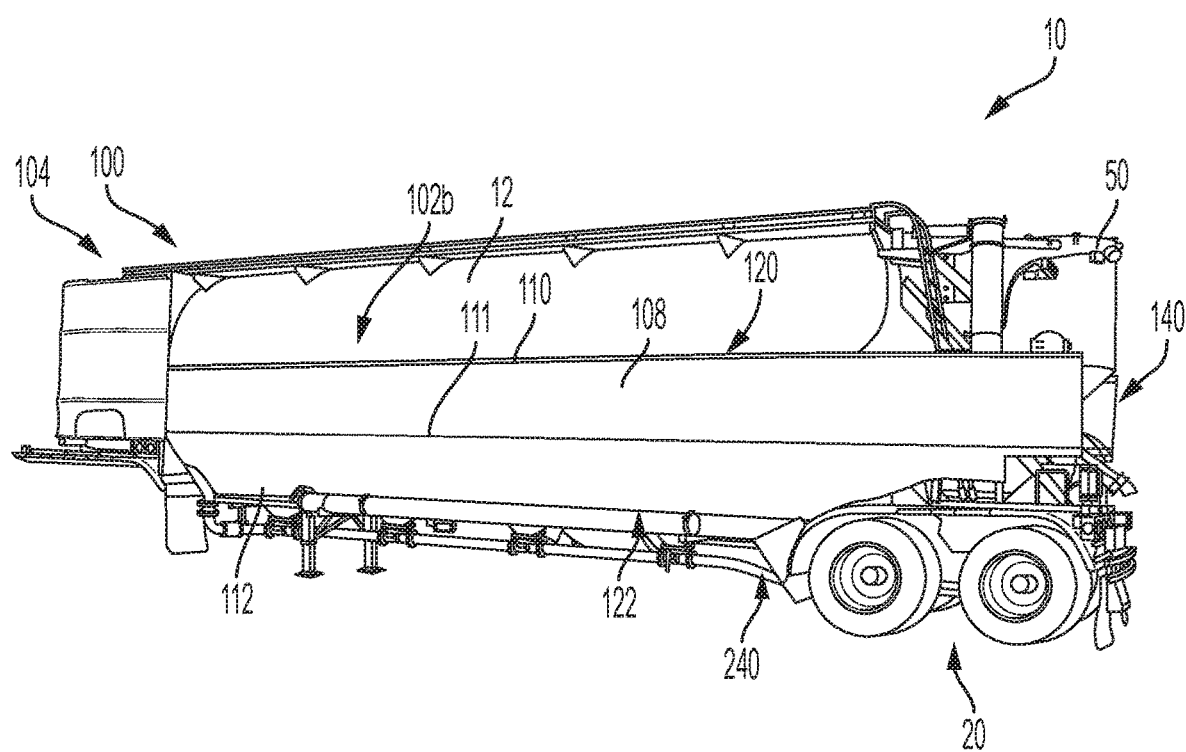
FIG. 3 is a rear perspective view of the left side of the tank trailer and aerodynamic curtain of FIG. 2.
Figure 4:
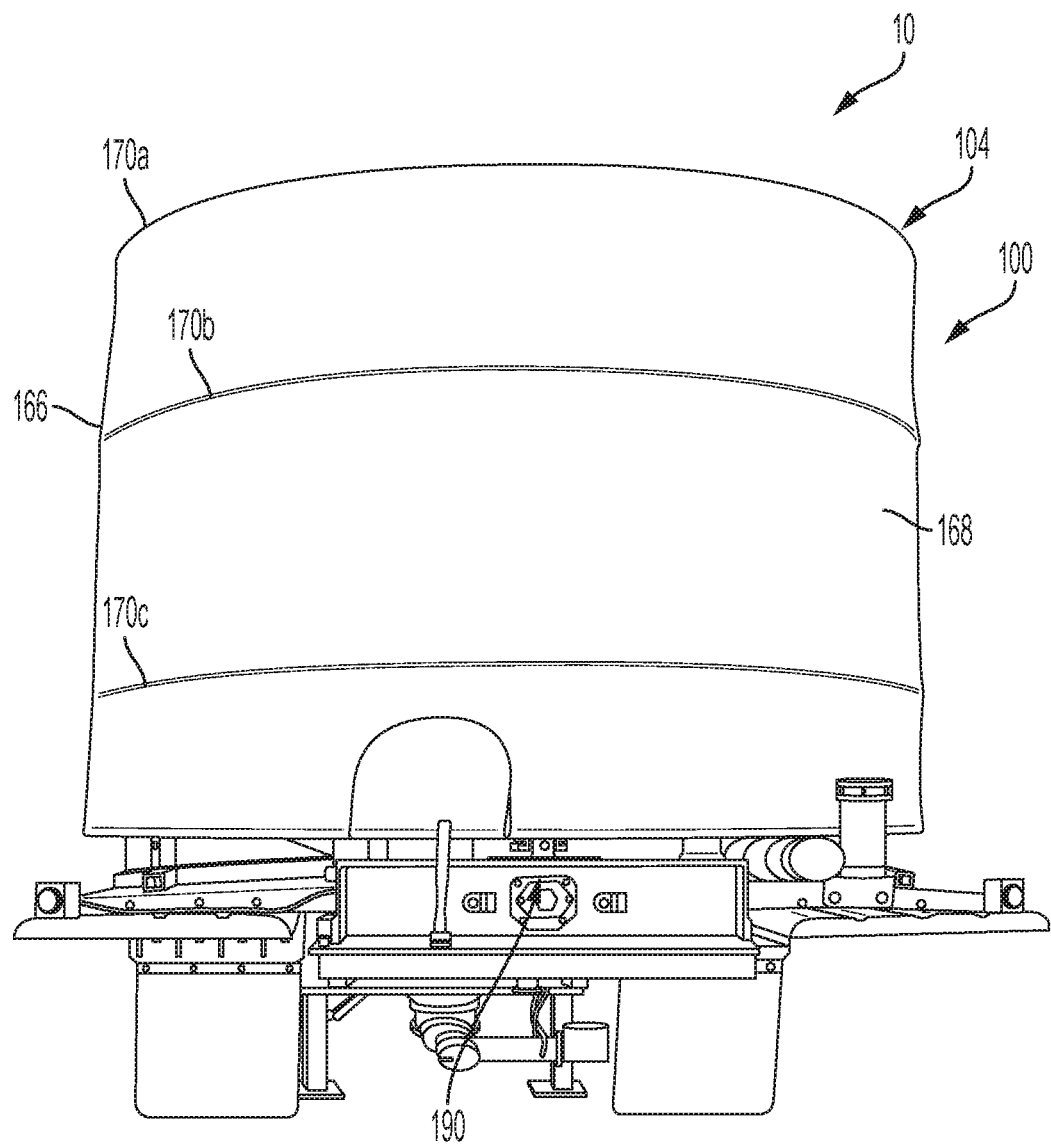
FIG. 4 is a front end view of the tank trailer and aerodynamic curtain of FIG. 2.
Figure 5:
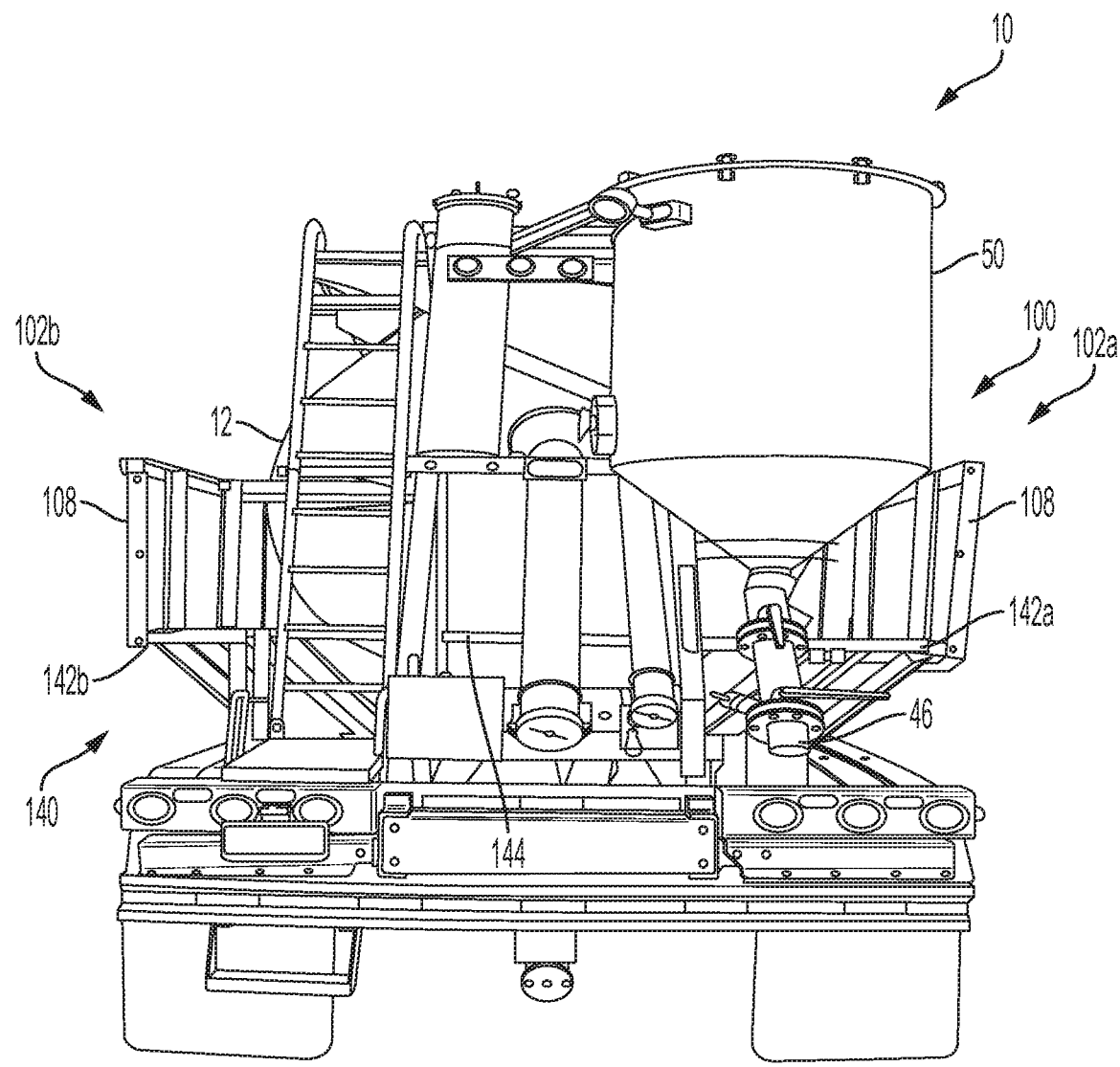
FIG. 5 is a rear end view of the tank trailer and aerodynamic curtain of FIG. 2.

With reference now to FIGS. 2-4, an illustrative aerodynamic curtain assembly 100 includes a first or right side assembly 102a extending along the right side 32 of the tank trailer 10, and a second or left side assembly 102b extending along the left side 34 of the tank trailer 10. As shown, the tank 12 is illustratively positioned between the first side assembly 102a and the second side assembly 102b. A front nose assembly 104 is supported by the front end 16 of the tank trailer 10, and cooperates with the first side assembly 102a and the second side assembly 102b.

Each of the side assemblies 102a and 102b are substantially identical. As such, while the following description and accompanying drawings will focus on the first side assembly 102a, it should be appreciated that the second side assembly 102b includes substantially similar components.

With reference to FIGS. 2, 3, 5 and 7-14, each side assembly 102a and 102b illustratively includes a side support structure 106, and a flexible side air deflector screen 108 coupled to the side support structure 106. The side support structure 106 illustratively includes an upper support member 110 and a lower support member 112 extending longitudinally along the respective side 32 and 34 of the tank trailer 10. More particularly, the upper support member 110 is positioned above and extends parallel to the lower support member 112. An intermediate support member 111 may extend parallel to and between the upper and lower support members 110 and 112. Each support member 110 and 112 illustratively comprises a rigid member, such as an aluminum bar.

Figure 7:
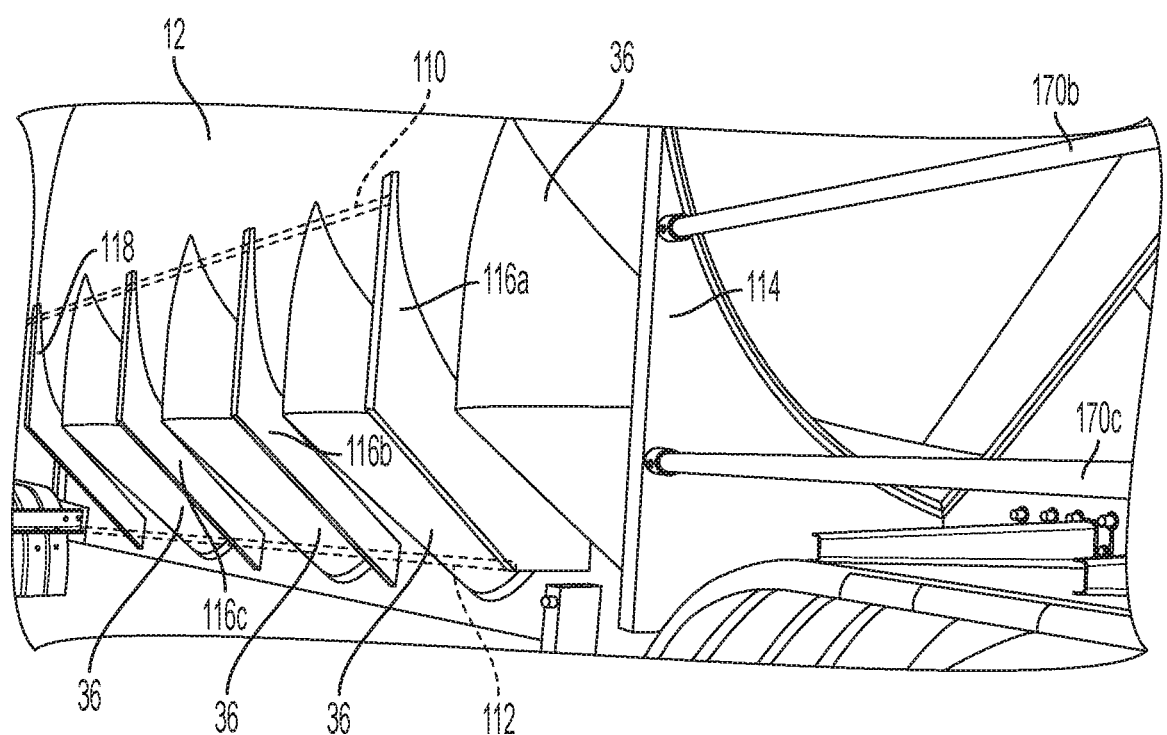
FIG. 7 is a perspective view of illustrative support structure weldments coupled to the right side of the tank trailer of FIG. 2.
Figure 8:
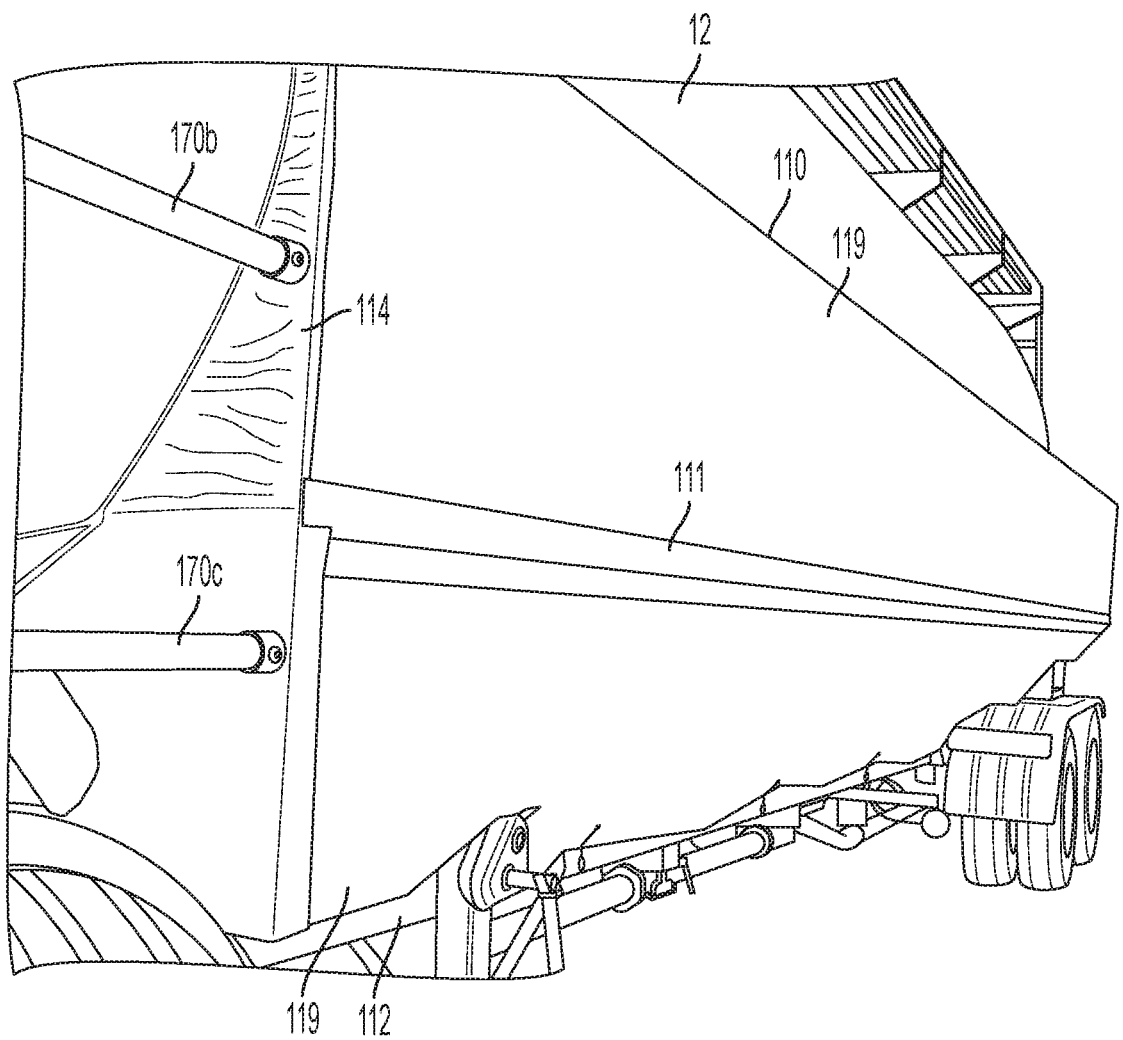
FIG. 8 is a front perspective view of an illustrative support structure coupled to the mid-section of the left side of the tank trailer of FIG. 2.
Figure 9:
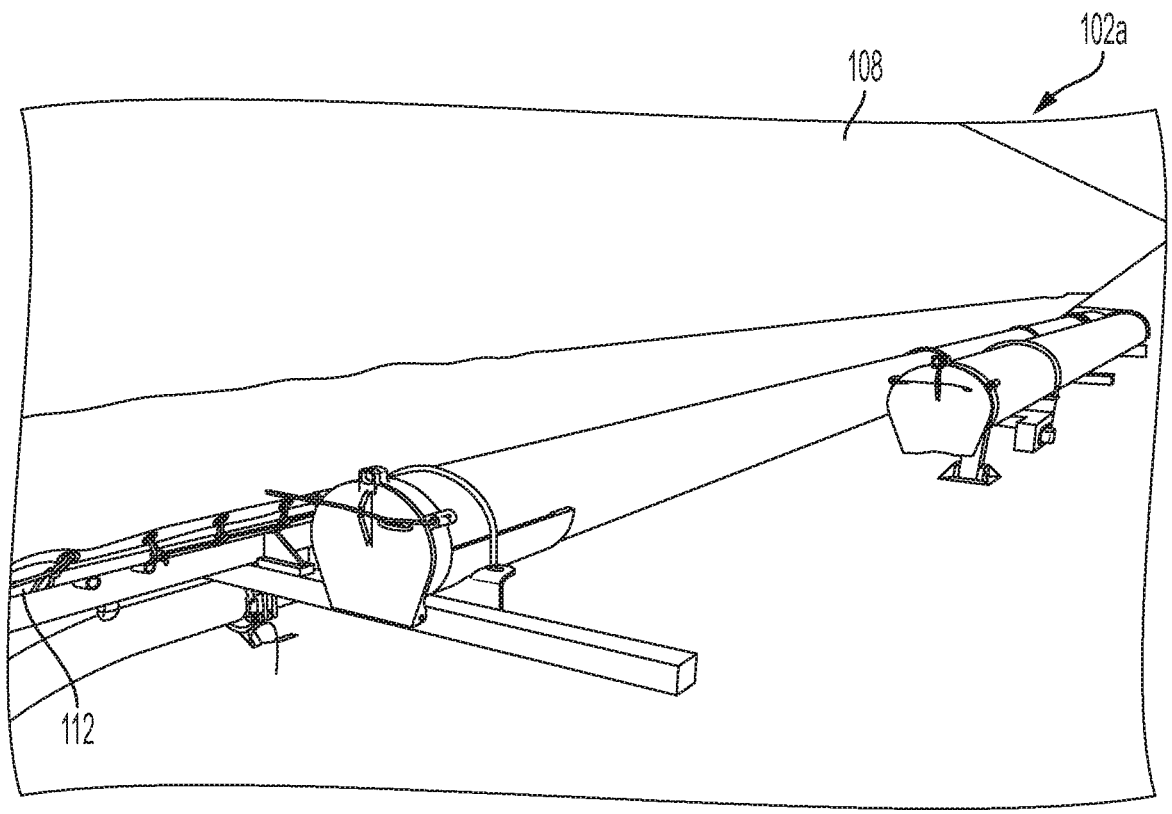
FIG. 9 is a detailed perspective view of the lower portion of the right side of the aerodynamic curtain of FIG. 2.
Figure 10:
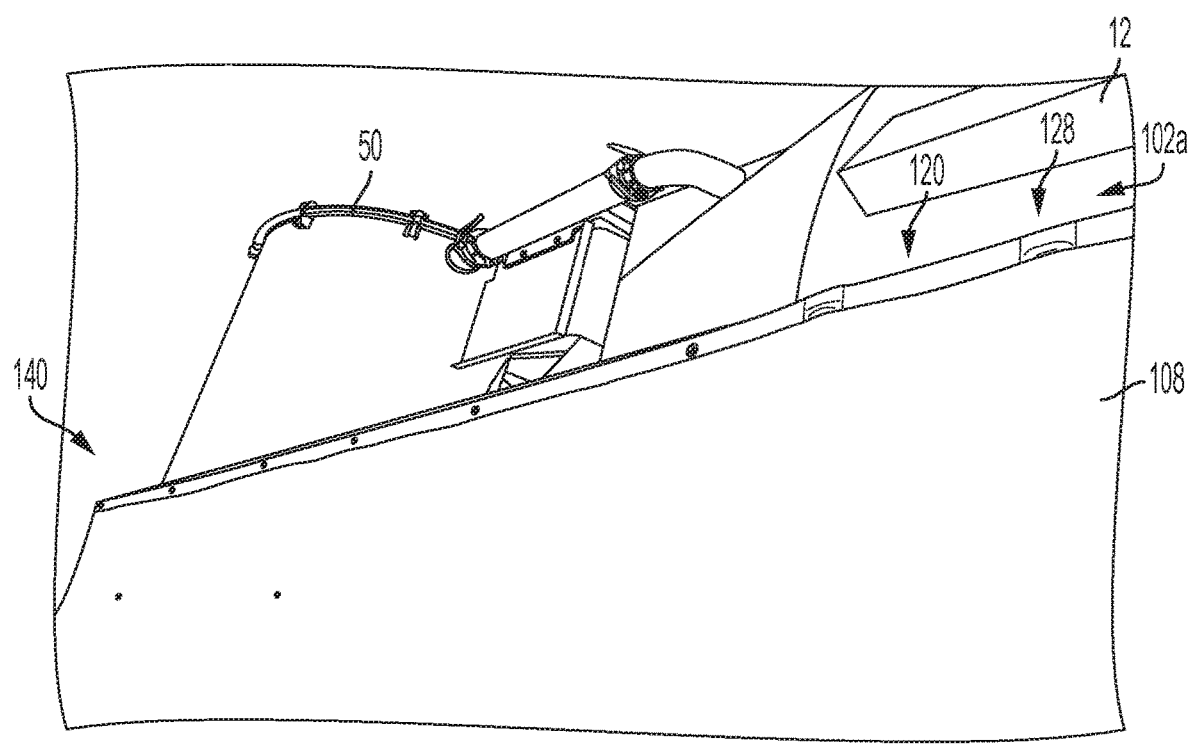
FIG. 10 is a detailed perspective view of the upper portion of the aerodynamic curtain of FIG. 9.

The support members 110 and 112 are illustratively secured to brackets 114, 116a, 116b, 116c and 118 coupled to the respective sides of the tank 12 (support members 110 and 112 shown in phantom in FIG. 7 for clarity). The front bracket 114 is illustratively welded to the front end of the tank 12, while the rear bracket 118 is illustratively welded to the rear end of the tank 12. The side brackets 116a, 116b, and 116c are illustratively longitudinally spaced apart and welded to the sides of the tank 12 intermediate the silos 36. As shown in the illustrative embodiment of FIG. 8, support panels 119 may be coupled to the brackets 114, 116a, 116b, 116c and 118. The support panels 119 may be formed of Kemlite, available from Crane Composites Inc. of Channahon, Ill. The support panels 119 are an option for providing additional structural rigidity to the side assemblies 102, but may be eliminated in order to reduce assembly weight and cost.

As shown in FIGS. 2, 3 and 11-13, the illustrative flexible side air deflector screen 108 includes an upper end 120 and a lower end 122, and extends longitudinally between a front end 124 and a rear end 126. An upper coupler 128 secures the upper end of the flexible side air deflector screen 108 to the upper support member 110, and a lower coupler 130 secures the lower end of the flexible side air deflector screen 108 to the lower support member 112. The side air deflector screen 108 may be formed of conventional tarp material, such as polyvinyl chloride (PVC).

Figure 11:
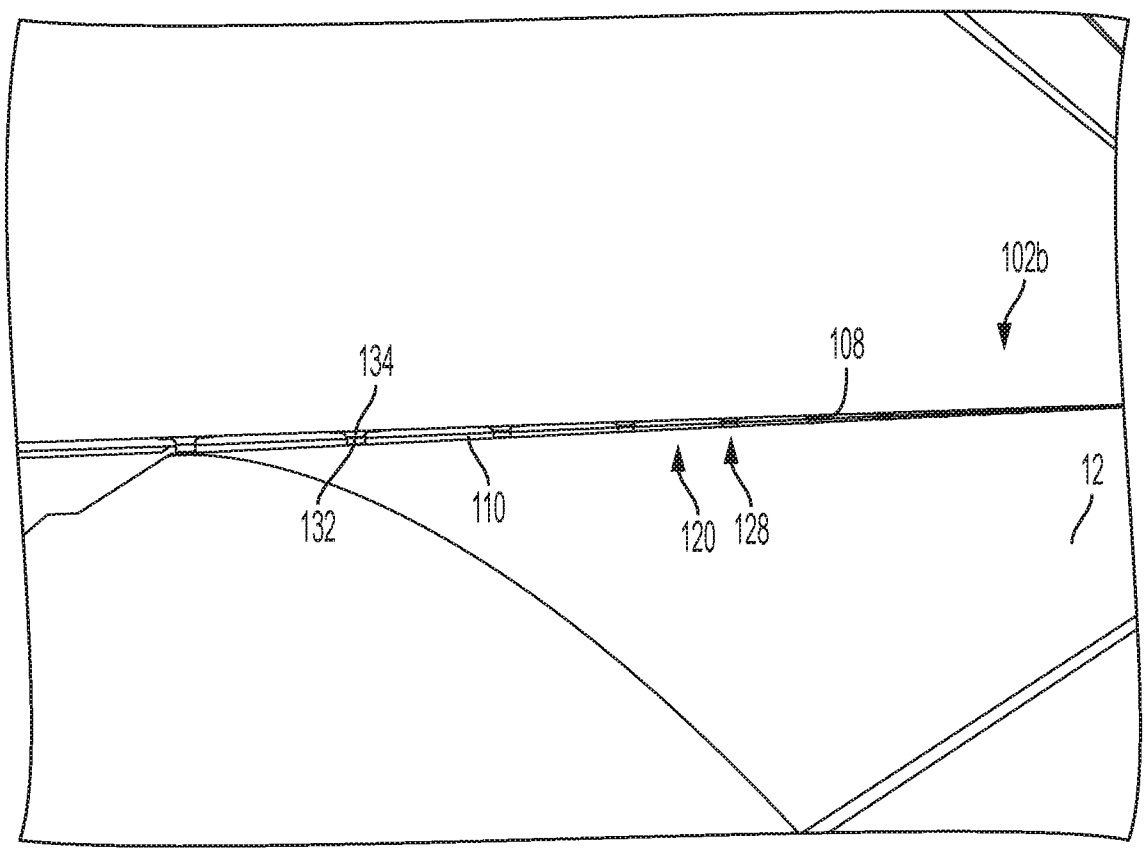
FIG. 11 is a top plan view of the upper portion of the aerodynamic curtain of FIG. 9.
Figure 12:
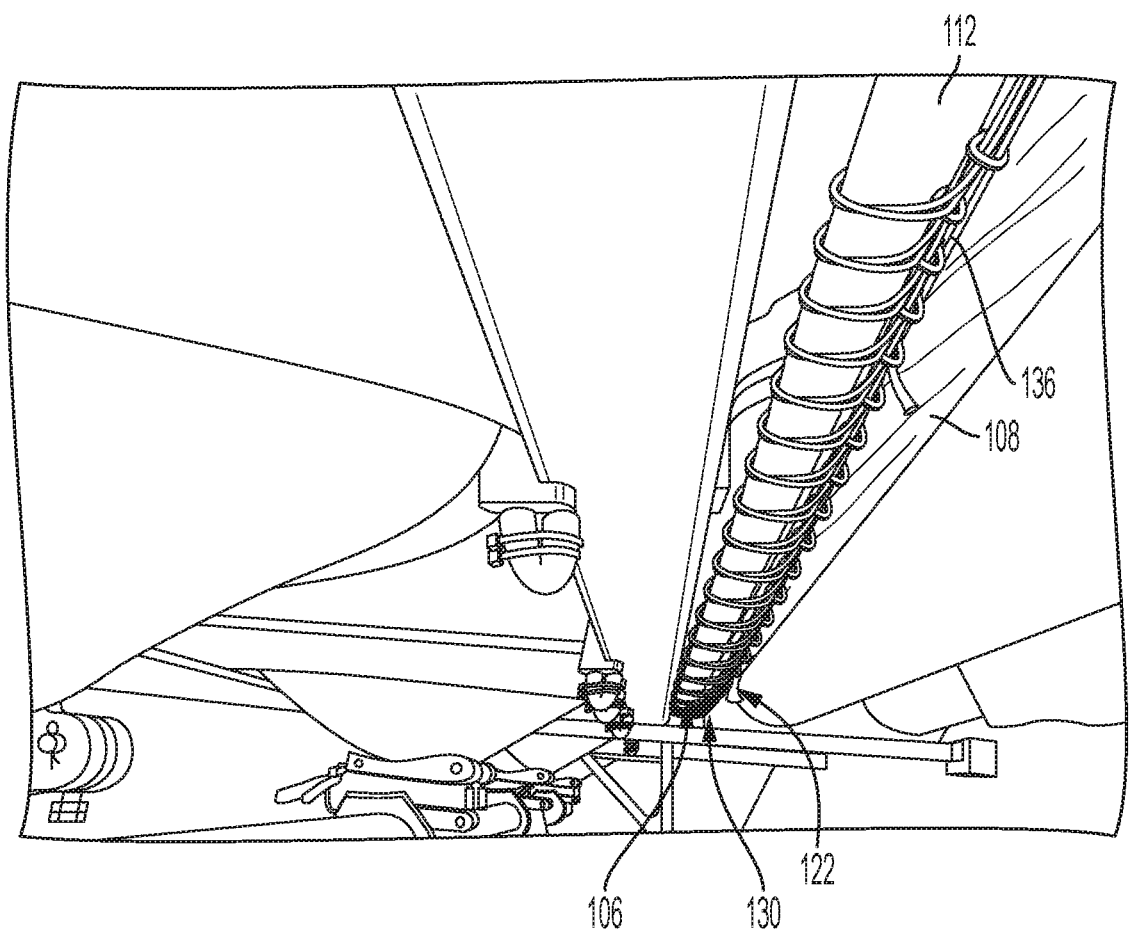
FIG. 12 is a bottom perspective view of the lower portion of the aerodynamic curtain of FIG. 9.
Figure 13:
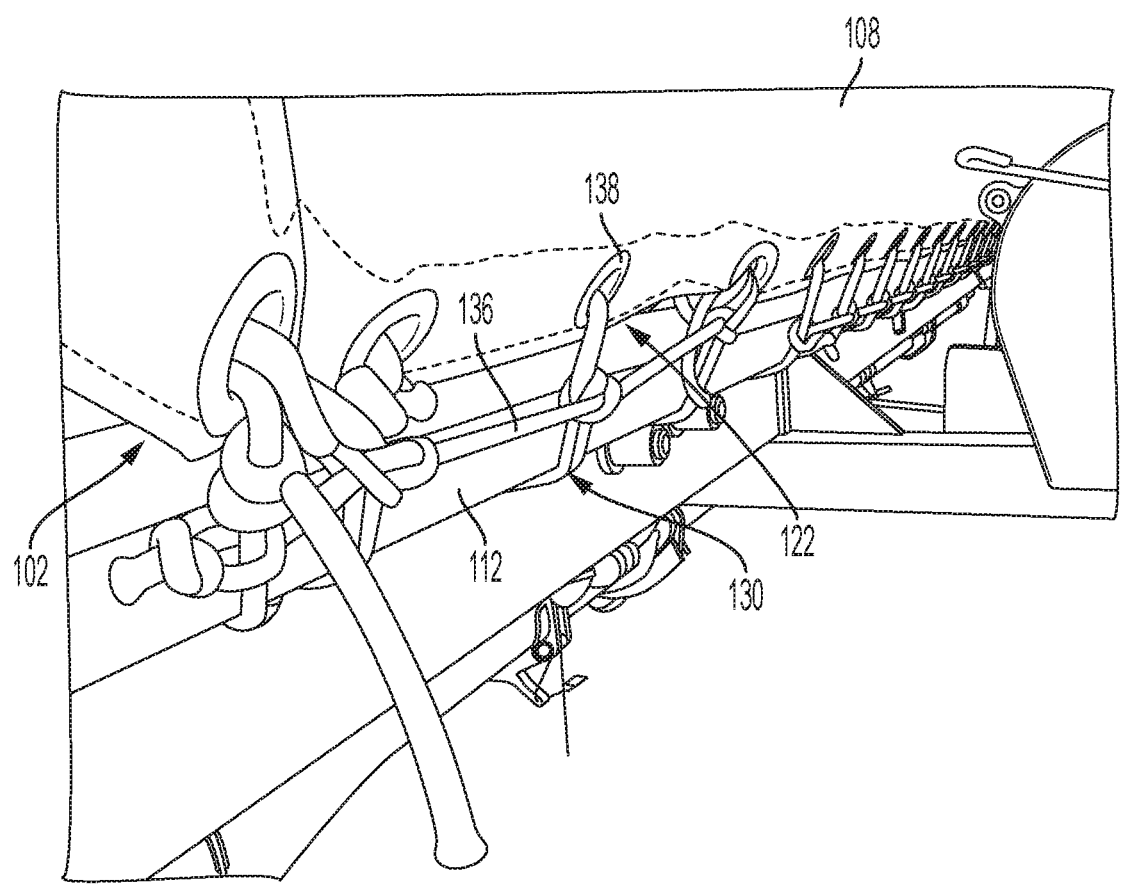
FIG. 13 is a perspective view of the lower coupler of the aerodynamic curtain of FIG. 9.

With reference to FIG. 11, the upper coupler 128 illustratively comprise a plurality of spring clips 132 clamping the upper end 120 of the flexible side air deflector screen 108 to the upper support member 110. Pockets 134 are formed within the upper end of the flexible side air deflector screen 108 to receive the clips 132. As shown in FIGS. 12 and 13, the lower coupler 130 illustratively comprises a cord 136 (e.g., nylon) passing through eyelets 138 in the flexible side air deflector screen 108 to secure the lower end 122 of the flexible side air deflector screen 108 to the lower support member 112.

With reference to FIGS. 5 and 28-32, a tail support 140 is illustratively coupled to the first side assembly 102a and the second side assembly 102b. The tail support 140 illustratively includes a first tail frame 142a and a second tail frame 142b laterally spaced apart from the first tail frame 142a. Illustratively, the first tail frame 142a is coupled to the first side assembly 102a, and the second tail frame 142b is coupled to the second side assembly 102b. The first tail frame 142a supports a rear end of the flexible side air deflector screen 108 of the first side assembly 102a, and the second tail frame 142b supports a rear end of the flexible side air deflector screen 108 of the second side assembly 102b. Cross members 144 illustratively extend laterally between the tail frames 142a and 142b and vertical supports 146 coupled to the frame 14.

Each of the tail frames 142a and 142b are substantially identical. As such, while the following description will focus on the first tail frame 142a, it should be appreciated that the second tail frame 142b includes substantially similar components.

With further reference to FIGS. 28-32, each of the first tail frame 142a and the second tail frame 142b includes a rear support structure 150 including an upper longitudinal support member 152, a lower longitudinal support member 154, and an intermediate longitudinal support member 156 positioned between the upper longitudinal support member 152 and the lower longitudinal support member 154. Vertical braces 158 illustratively extend between the upper longitudinal support member 152 and the intermediate longitudinal support member 156. Angle support members 160 illustratively couple the lower longitudinal support member 154 to the intermediate longitudinal support member 156. The lower longitudinal support member 154 is illustratively coupled to the frame 14. Fasteners 162 (such as bolts, nuts and washers) illustratively secure the flexible side air deflector screen 108 to the upper longitudinal support member 152, the lower longitudinal support member 154, the intermediate longitudinal support member 156, and the vertical braces 158.

Figure 14:
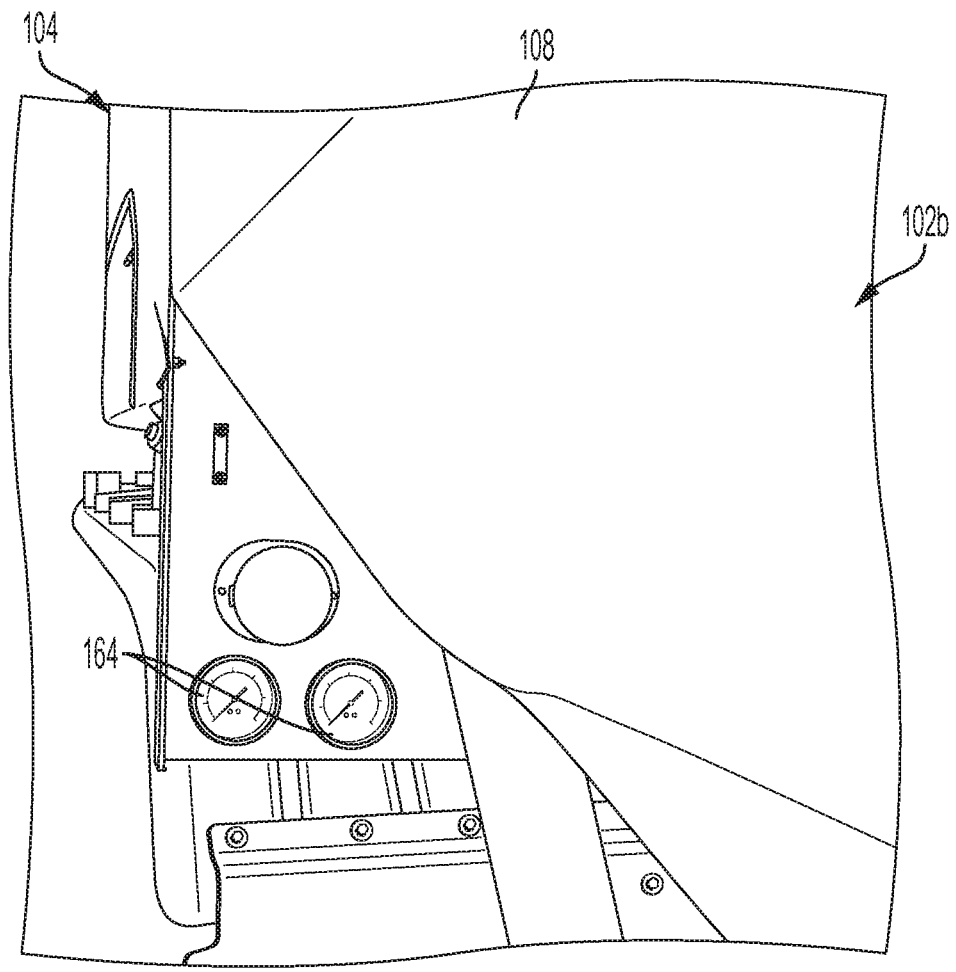
FIG. 14 is a detailed perspective view of illustrative control gauges supported by a weldment of the aerodynamic curtain of FIG. 2.
Figure 24:
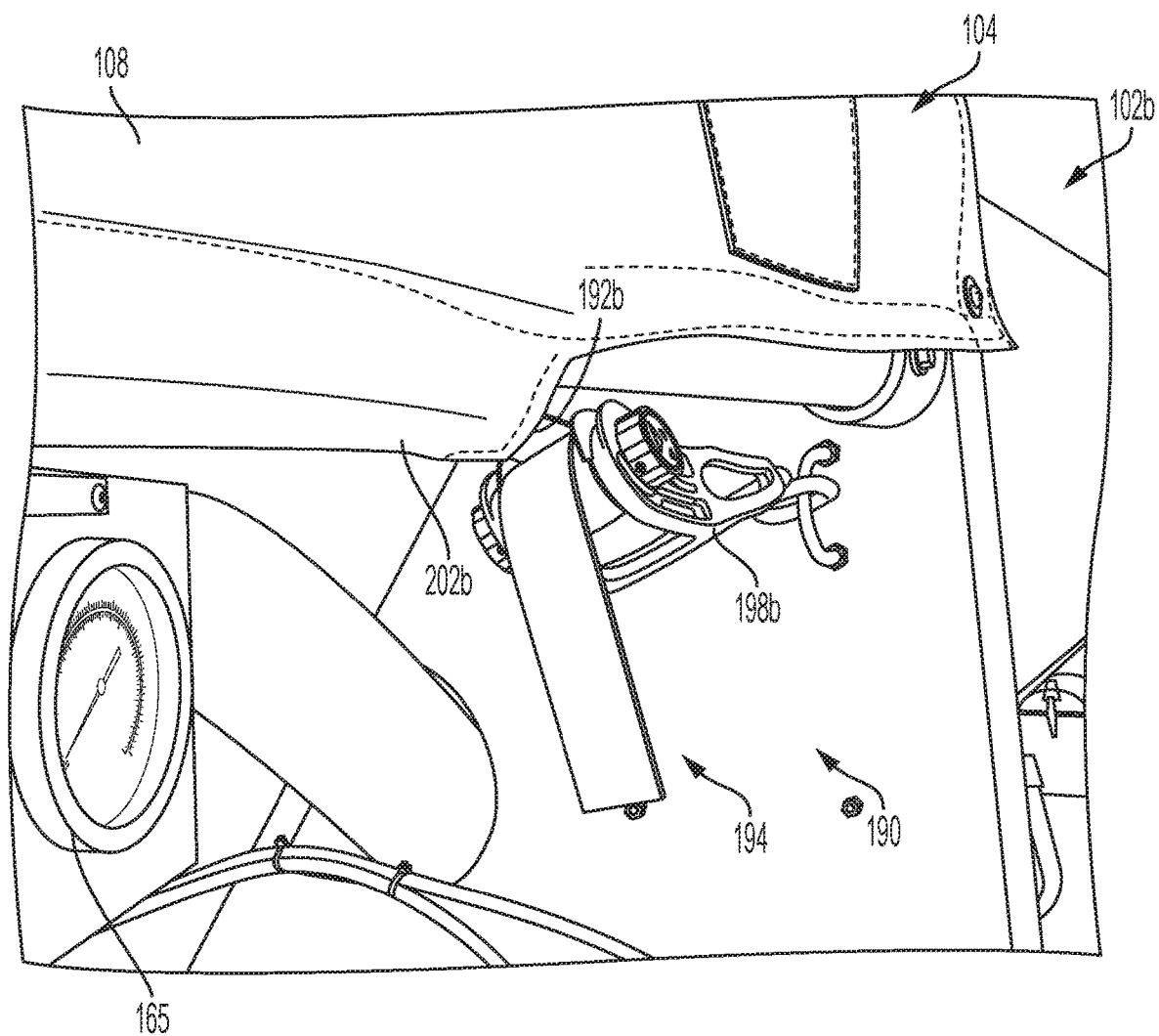
FIG. 24 is a perspective view of an illustrative right tensioning member of the nose assembly of FIG. 15.
Figure 25:
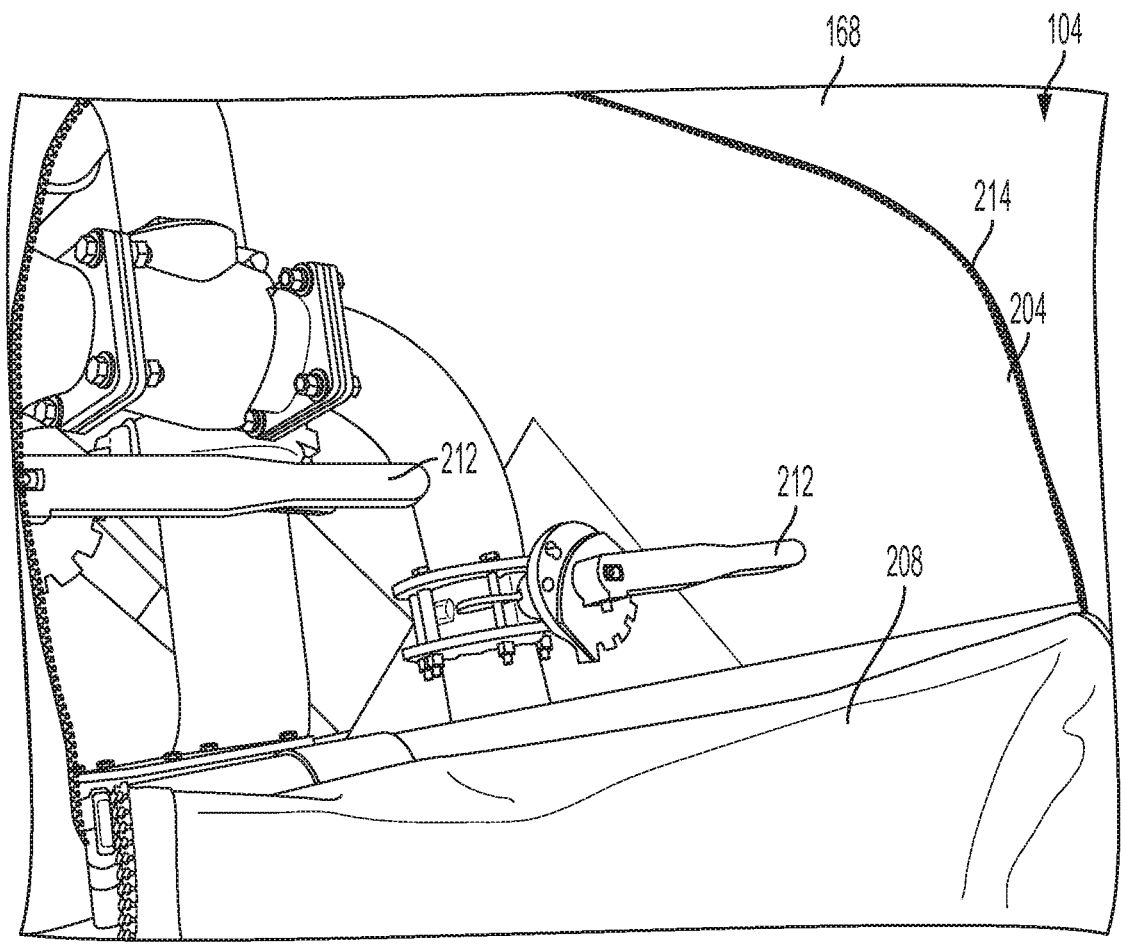
FIG. 25 is a perspective view of an illustrative access opening, with the closure flap in an opened position.
Figure 26:
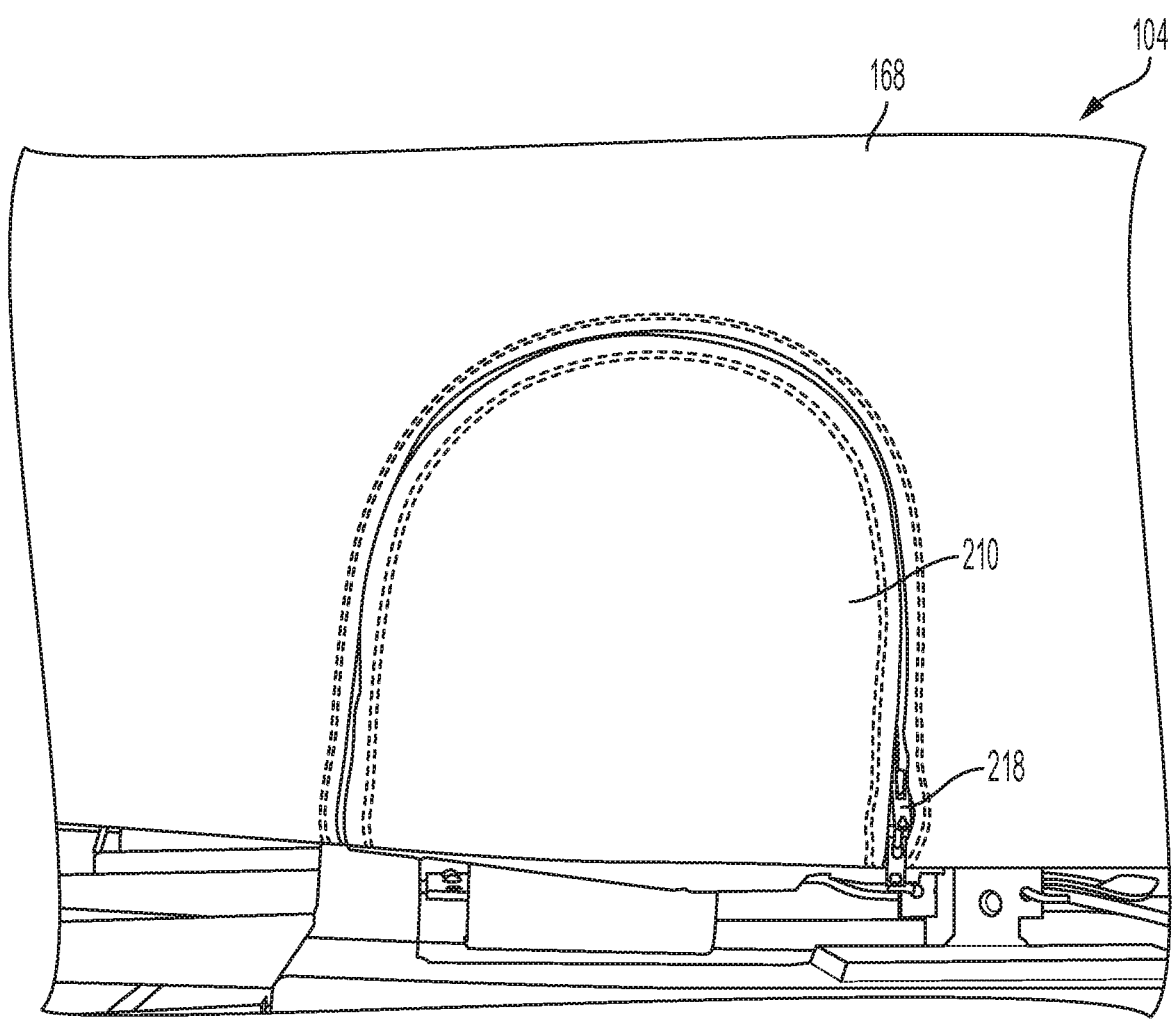
FIG. 26 is a perspective view of an illustrative valve access opening.
Figure 27:
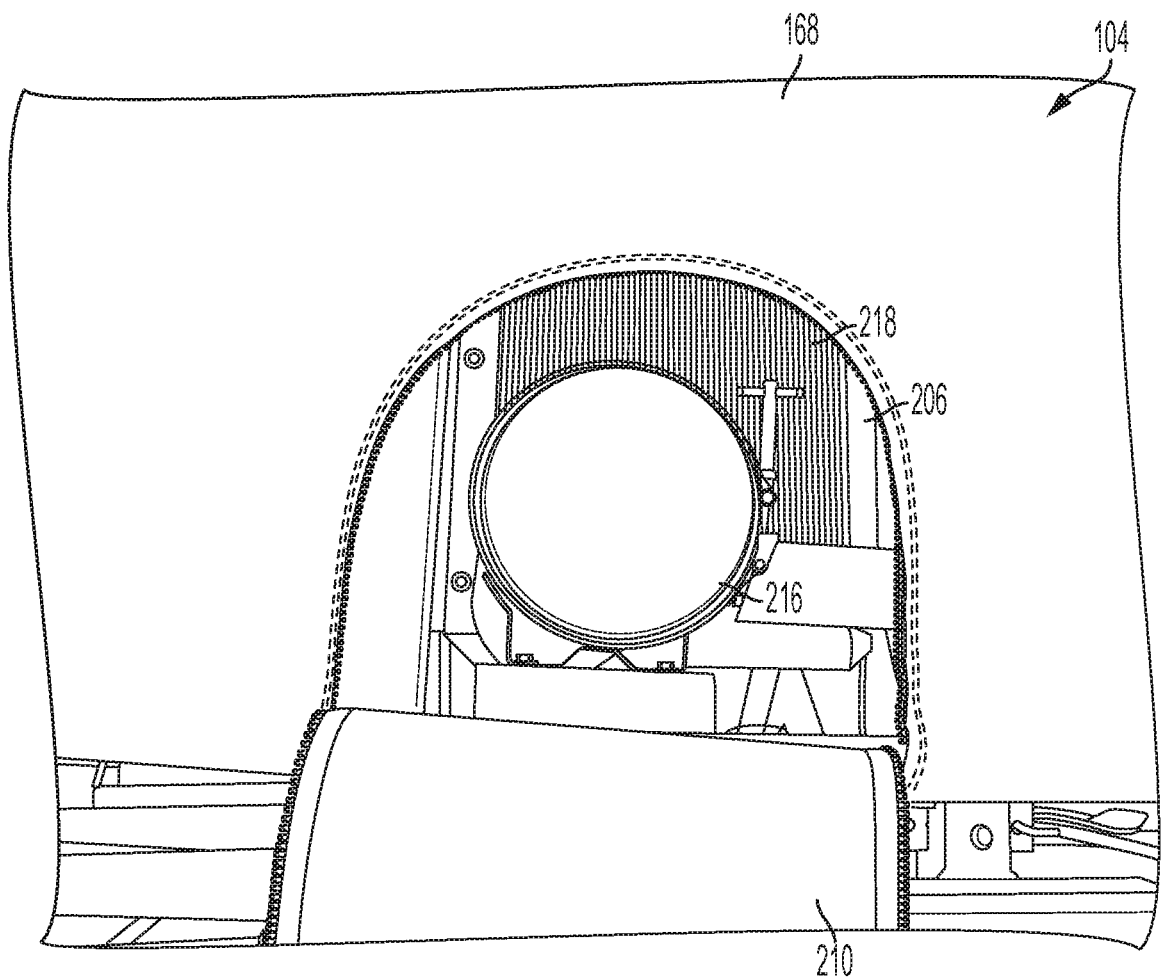
FIG. 27 is a perspective view of the access opening of FIG. 26, with the closure flap in an opened position.

As shown in FIGS. 1A and 14, standard pressure gauges 164 are positioned outside of the side air deflector screen 108 to provide easy access to the driver for material loading and unloading. With reference to FIGS. 1A and 24, temperature gauges 165 are illustratively positioned below the side air deflector screen 108 for easy viewing.

With reference to FIGS. 4, 6 and 15-27, the front nose assembly 104 illustratively includes a front support structure 166 coupled to the front end of the tank trailer 10, and a flexible front air deflector screen 168 coupled to the front support structure 166. The front air deflector screen 168 illustratively extends arcuately (in a horizontal plane) from the first side 32 of the tank trailer 10 to the second side 34 of the tank trailer 10 around the vacuum connection, the pressure connection and associated fittings. More particularly, the front air deflector screen 168 extends arcuately from a first upright (e.g., bracket 114) supported by the right side 32 of the tank trailer 10 to a second upright (e.g., bracket 114) supported by a left side 34 of the tank trailer 10. The front air deflector screen 168 illustratively extends vertically from above the frame 14 to above the tank 12.

The front support structure 166 illustratively includes a plurality of horizontally spaced arcuate support members 170a, 170b, 170c. Illustratively, each support member 170a, 170b, 170c is substantially u-shaped and includes opposing ends 172 and 174 coupled to receivers 176 supported by brackets 114 secured to the first and second sides 32 and 34 of the tank trailer 10. More particularly, the opposing ends 172 and 174 of each support member 170a, 170b, 170c are removable secured within receiver openings 178 by releasable fasteners, such as bolts 180. Each support member 170a, 170b, 170c are illustratively formed of a rigid, light weight material, such as aluminum tubing.

The upper support member 170a is illustratively received within an upper pocket 182 formed within the front air deflector screen 168. A releasable closure, such as a zipper 184, facilitates insertion of the upper support member 170a within the pocket 182. As such, the front air deflector screen 168 hangs downwardly from the upper support member 170a (e.g., similar to a curtain). Vertical supports 186 and 188 are coupled to the support members 170a, 170b, 170c to provide additional structural rigidity.

With reference to FIGS. 4 and 23-27, a tensioning member 190 extends horizontally to provide tension in a lower end of the flexible front air deflector screen 168 of the front nose assembly 104. The tensioning member 190 illustratively includes right and left tensioning straps 192a and 192b, each extending between opposing first and second ends 194 and 196. The first end 194 of each tensioning strap 190a, 190b is operably coupled to a tensioning device, such as a ratcheting buckle 198a and 198b, respectively. The second end 196 of each tensioning strap 190a, 190b is coupled to a center bracket 200. The tensioning straps 192a and 192b extend through pockets 202a and 202b, respectively, formed within a lower portion of the front air deflector screen 168.

Figure 28:
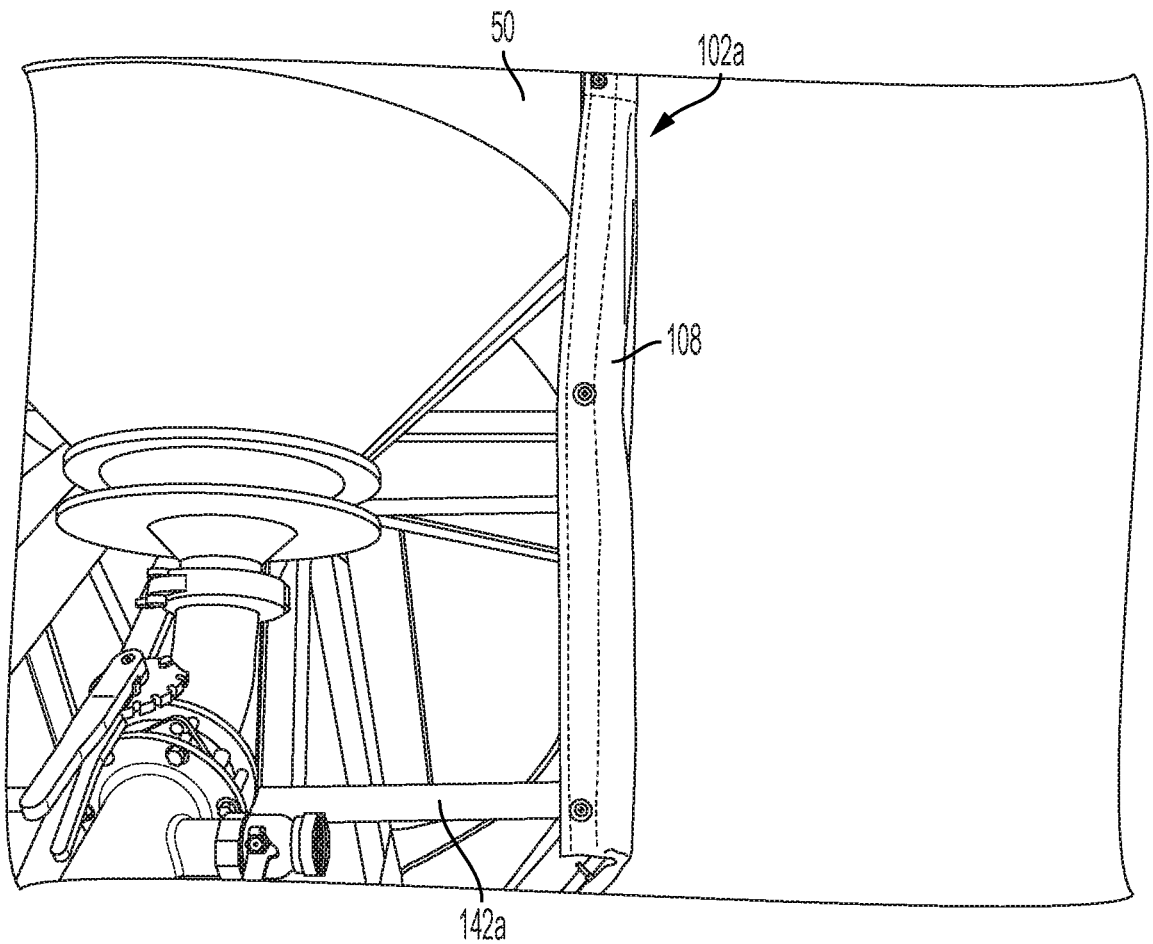
FIG. 28 is a rear perspective view of the right side of the tail assembly of the aerodynamic curtain of FIG. 10.
Figure 29:
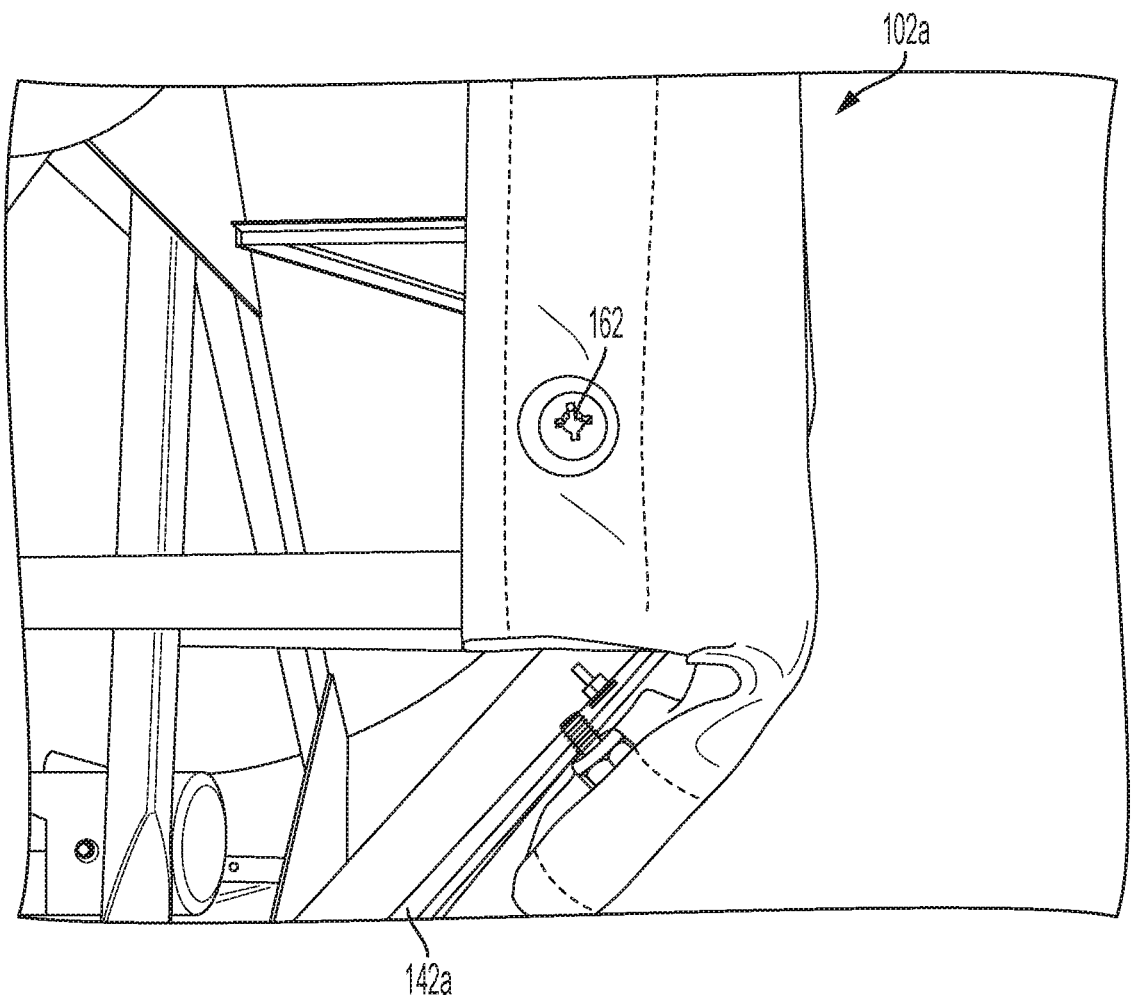
FIG. 29 is a detail view of the tail assembly of FIG. 28.
Figure 30:
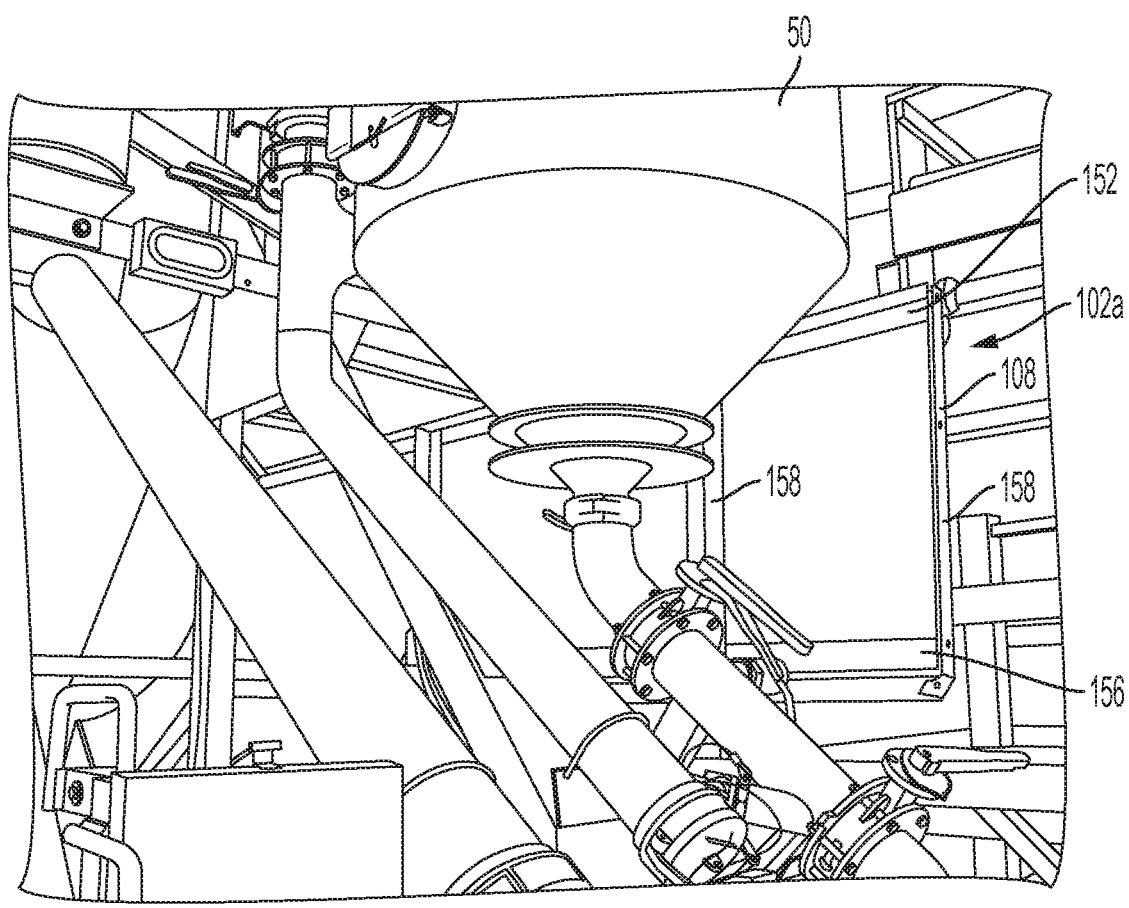
FIG. 30 is another rear perspective view of the right side of the tail assembly of FIG. 28.
Figure 31:
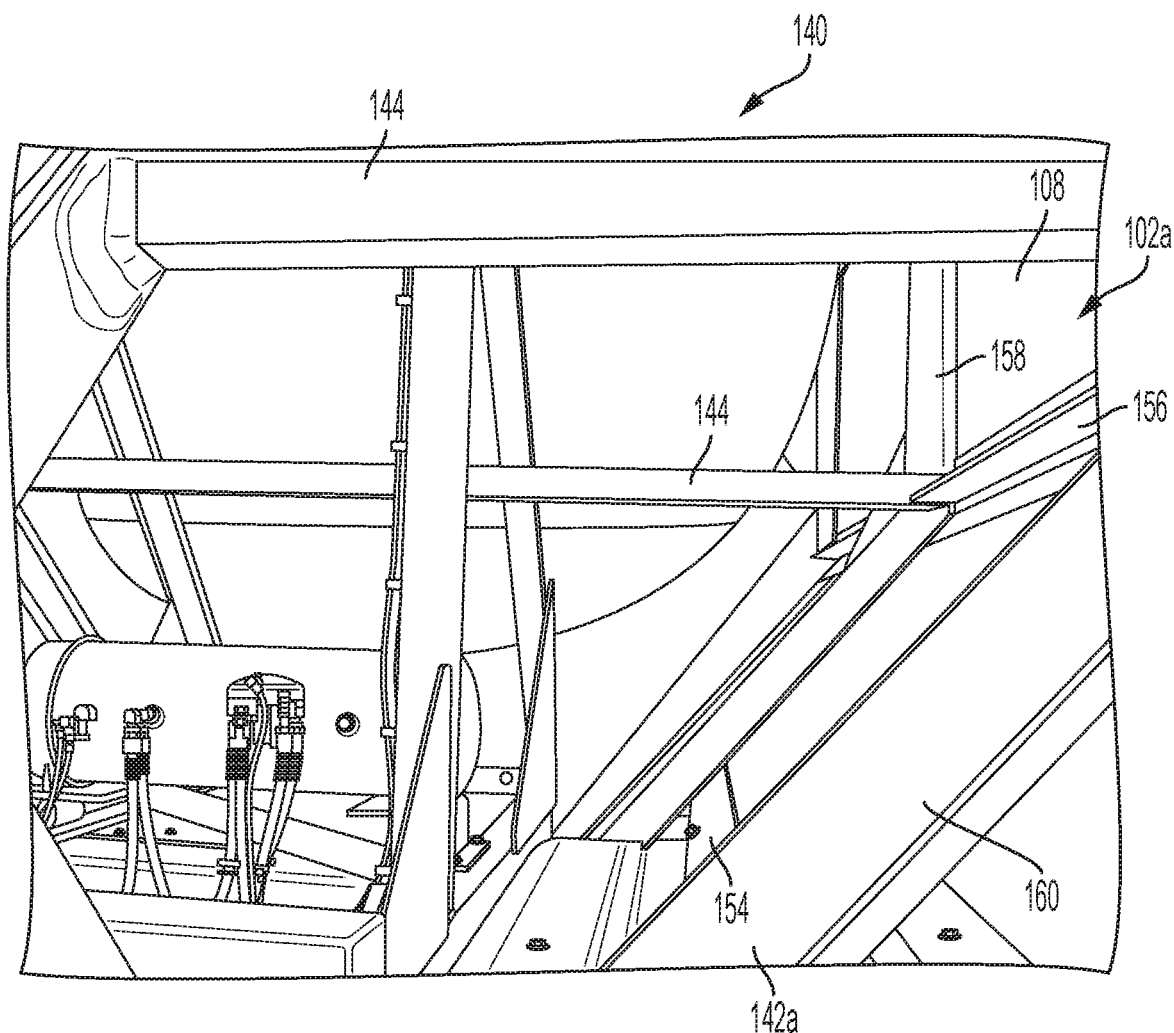
FIG. 31 is a detailed rear perspective view of the right side of the tail assembly of FIG. 28.
Figure 32:
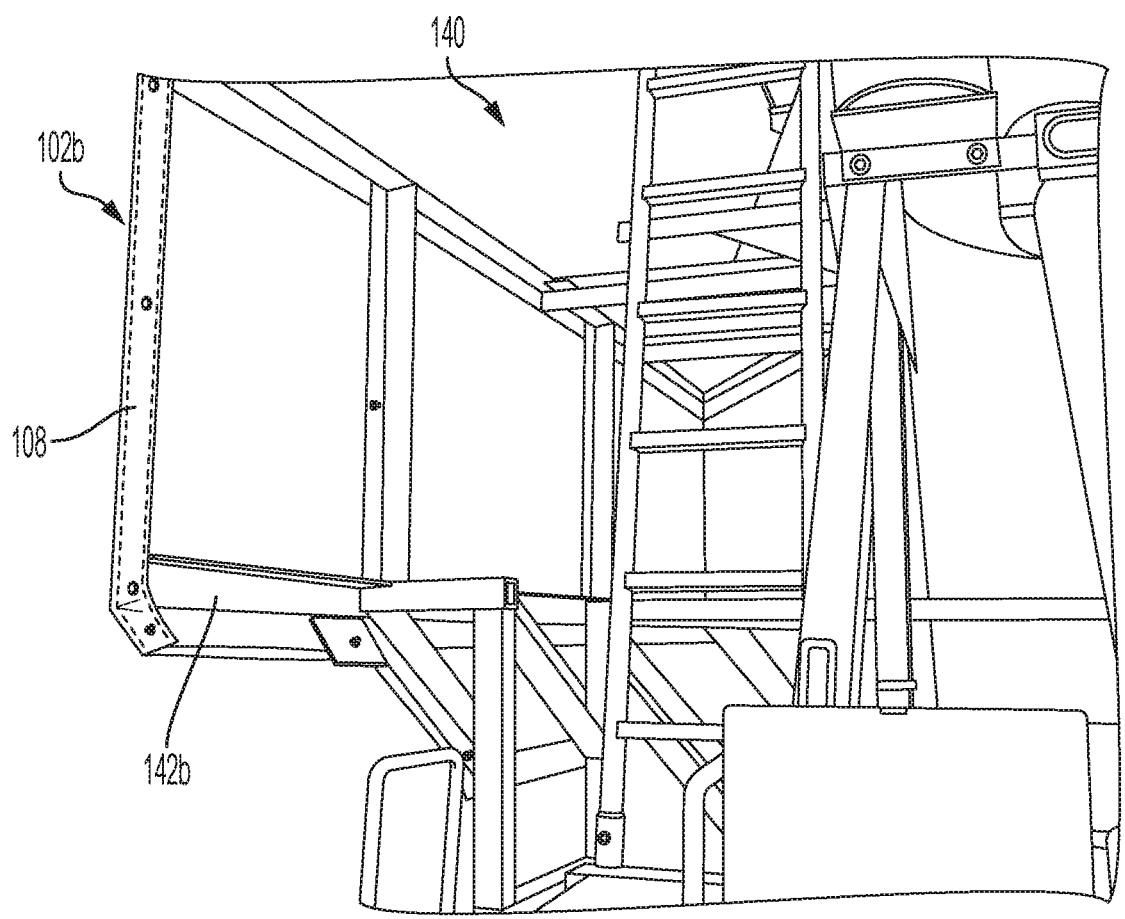
FIG. 32 is a rear perspective view of the left side of the tail assembly of the aerodynamic curtain of FIG. 10.

The front air deflector screen 168 of the front nose assembly 104 illustratively includes access openings 204 and 206, each with a closable flap 208 and 210, respectively. With reference to FIG. 28, opening 204 provides access to flow control valves 212, while flap 208 and associated closure member (zipper 214) closes the opening 204. With reference to FIGS. 29 and 30, opening 206 provides access to a filter 216, while flap 210 and associated closure member (zipper 218) closes the opening 206.

Figure 15:
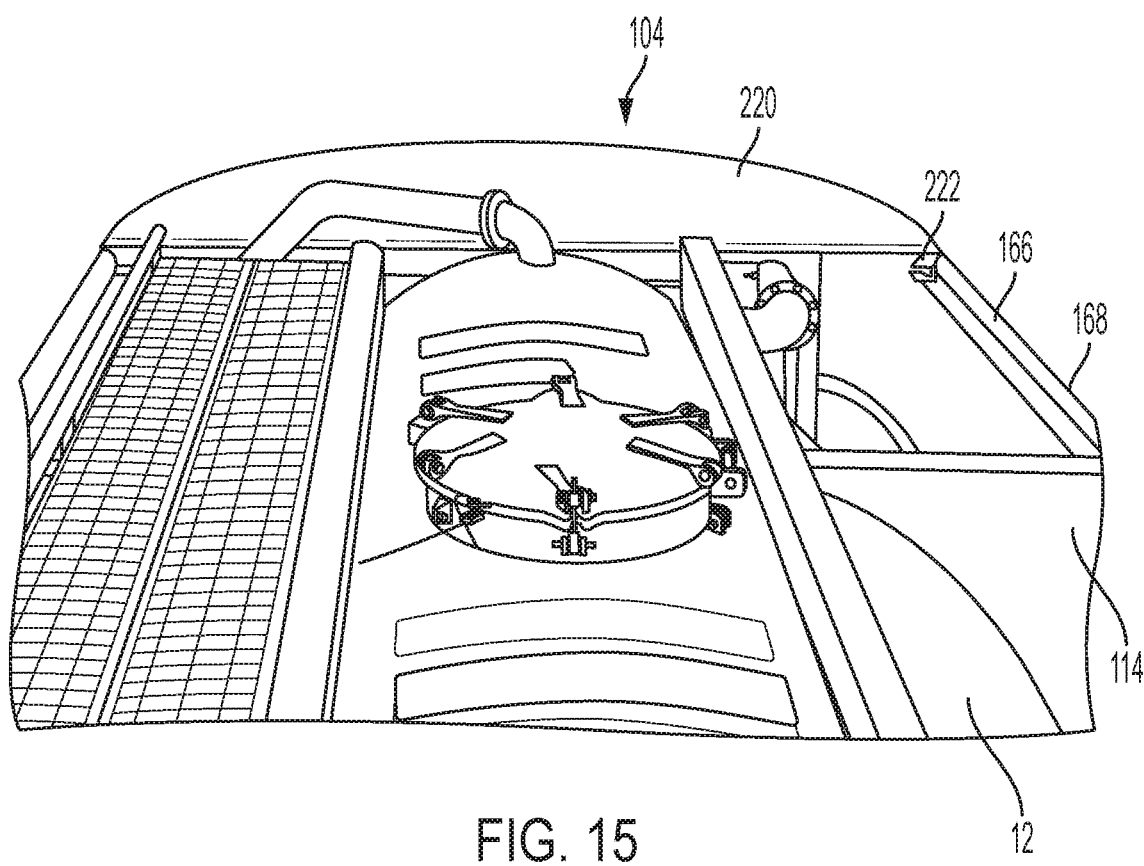
FIG. 15 is a top perspective view of the illustrative front or nose assembly of the aerodynamic curtain of FIG. 9.
Figure 16:
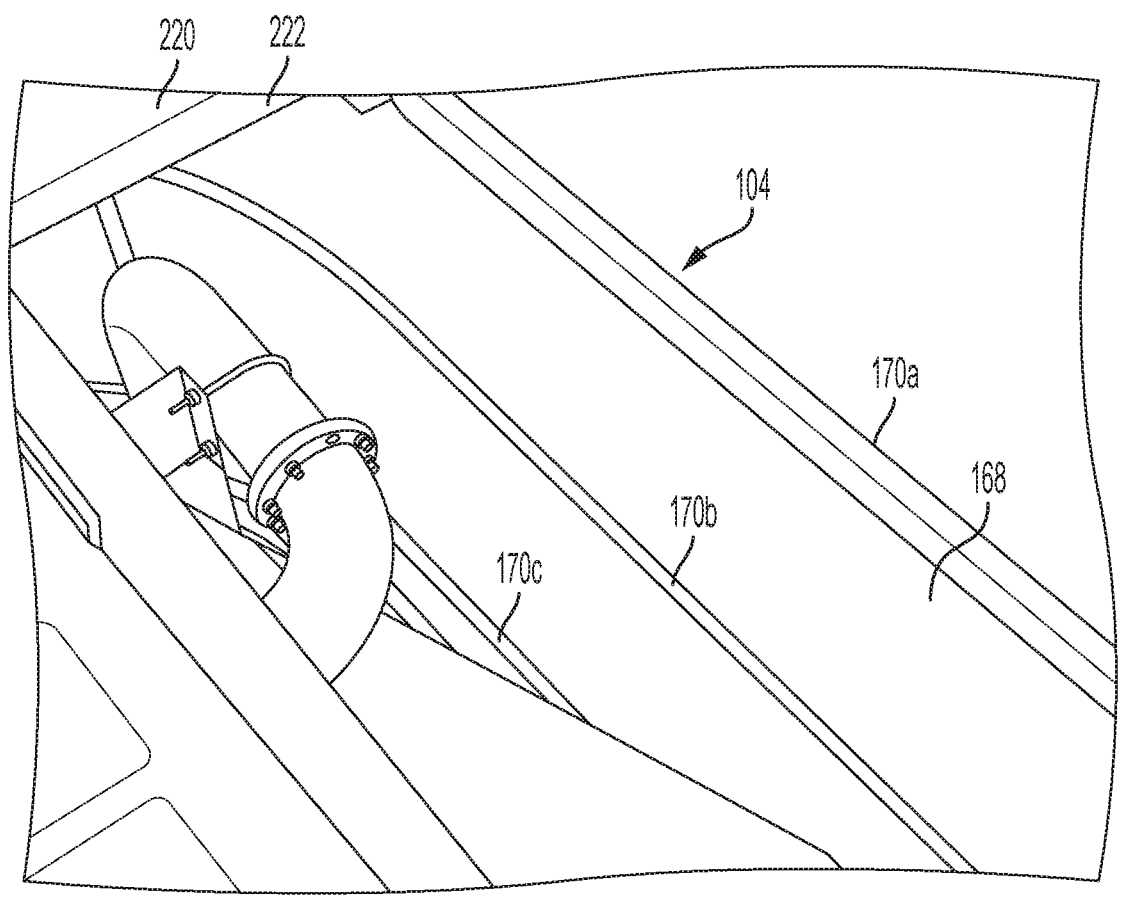
FIG. 16 is a top perspective view of the front right side of the nose assembly of FIG. 15.
Figure 17:
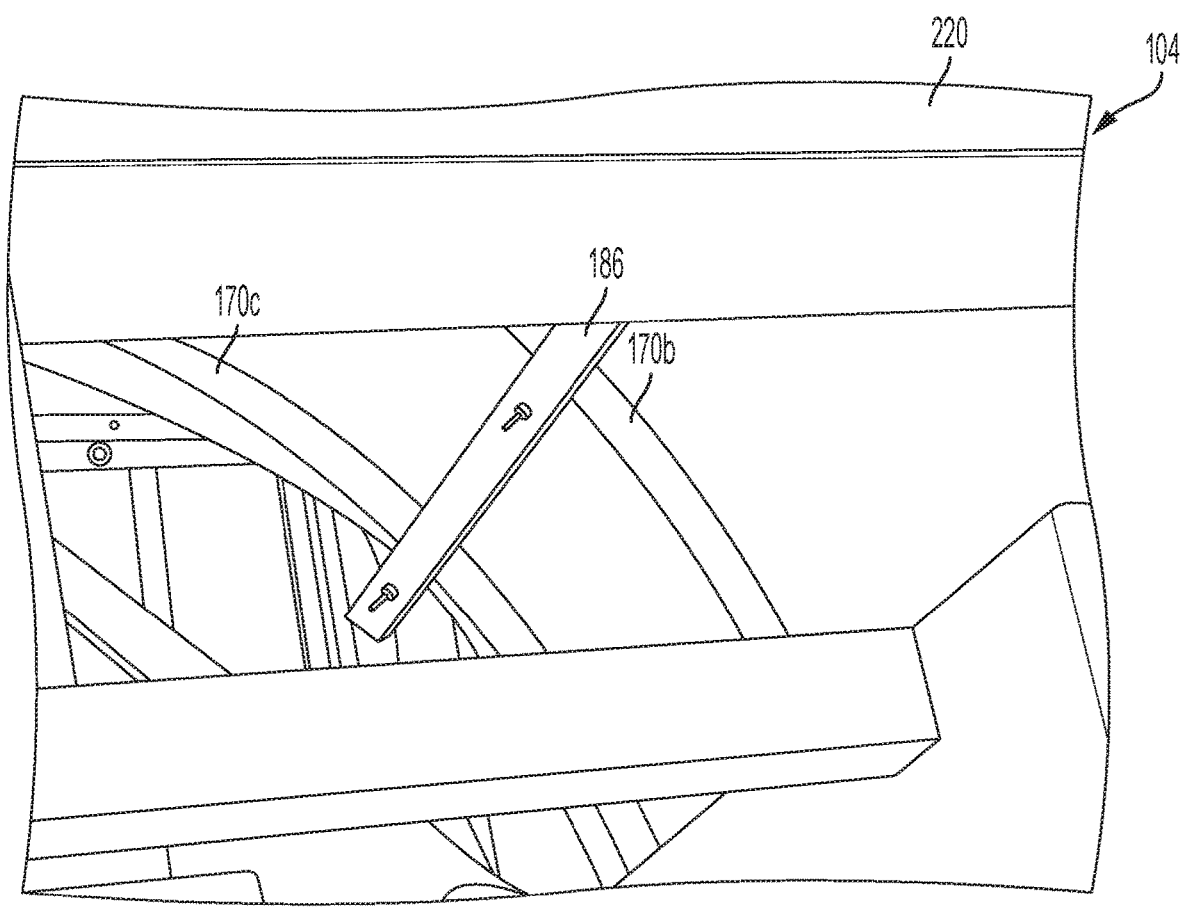
FIG. 17 is a detailed top perspective view of the right side of the nose assembly of FIG. 15.
Figure 18:
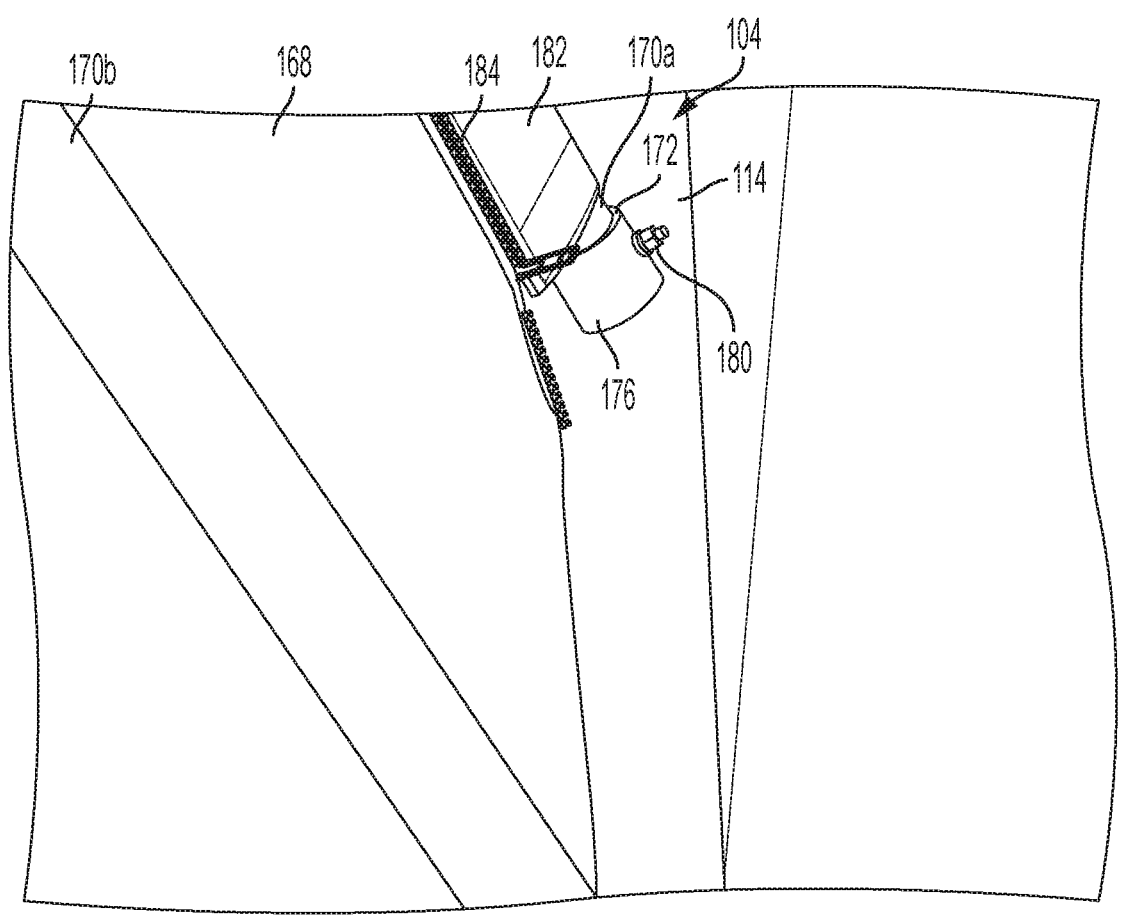
FIG. 18 is a perspective view of the coupling of the nose assembly to a weldment of the aerodynamic curtain of FIG. 2.
Figure 19:
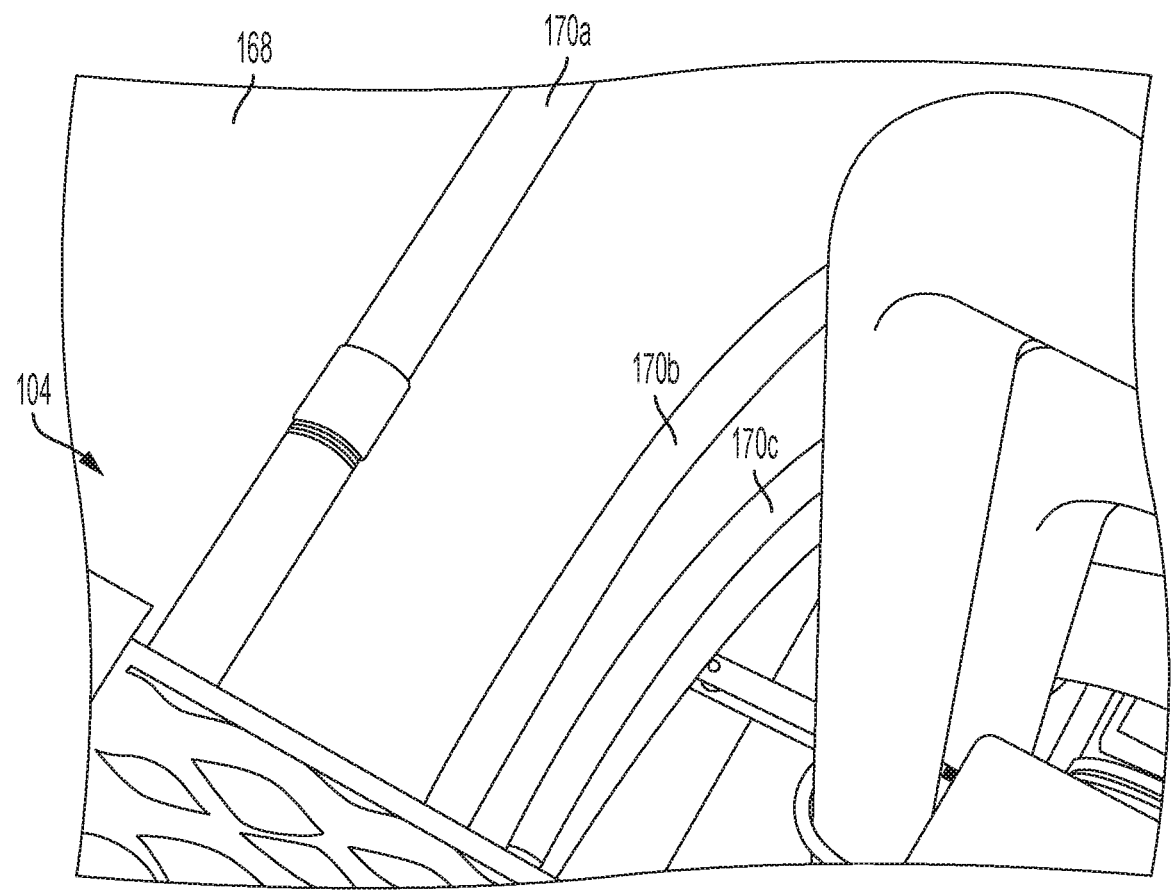
FIG. 19 is a top perspective view of the rear left side of the nose assembly of FIG. 15.
Figure 20:
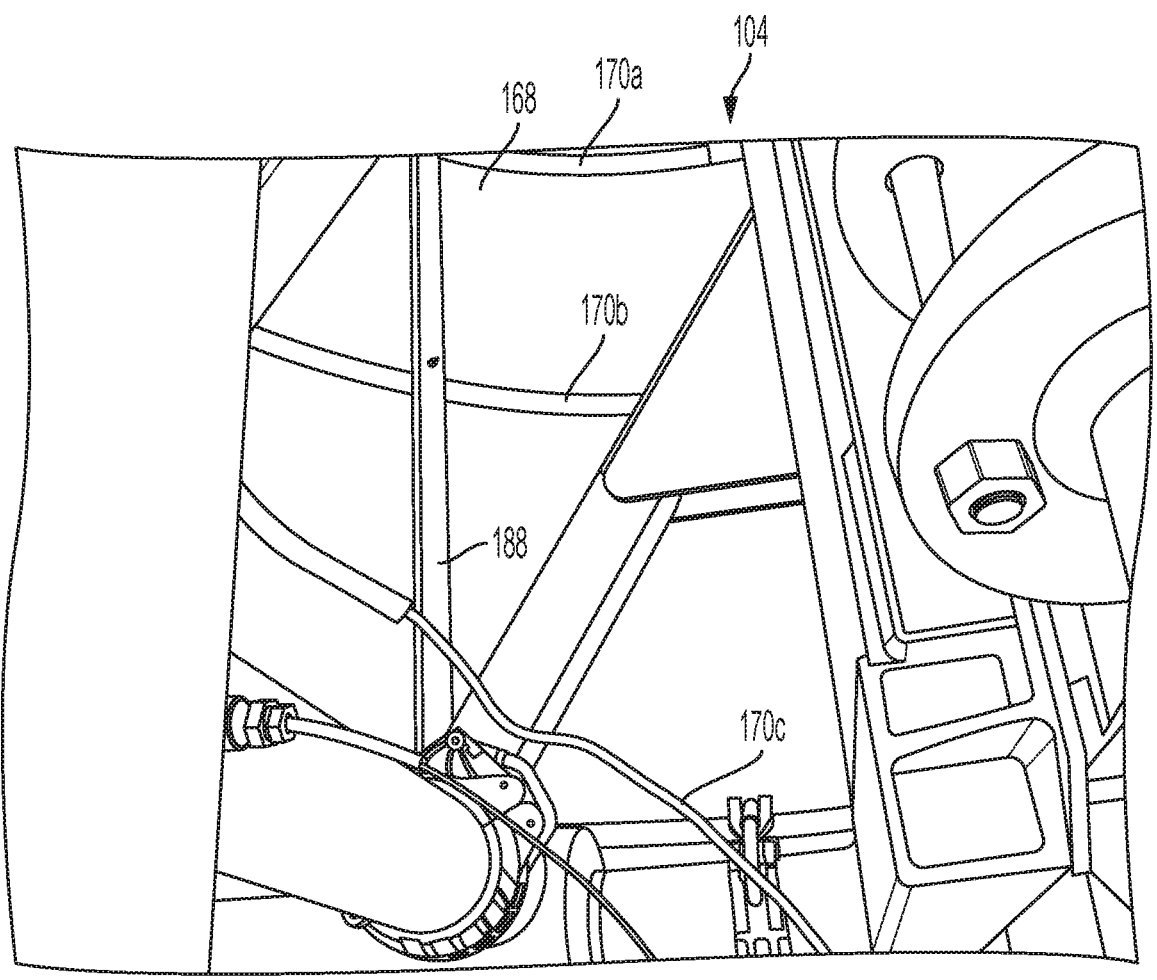
FIG. 20 is a detailed side perspective view of the left side of the nose assembly of FIG. 15.
Figure 21:
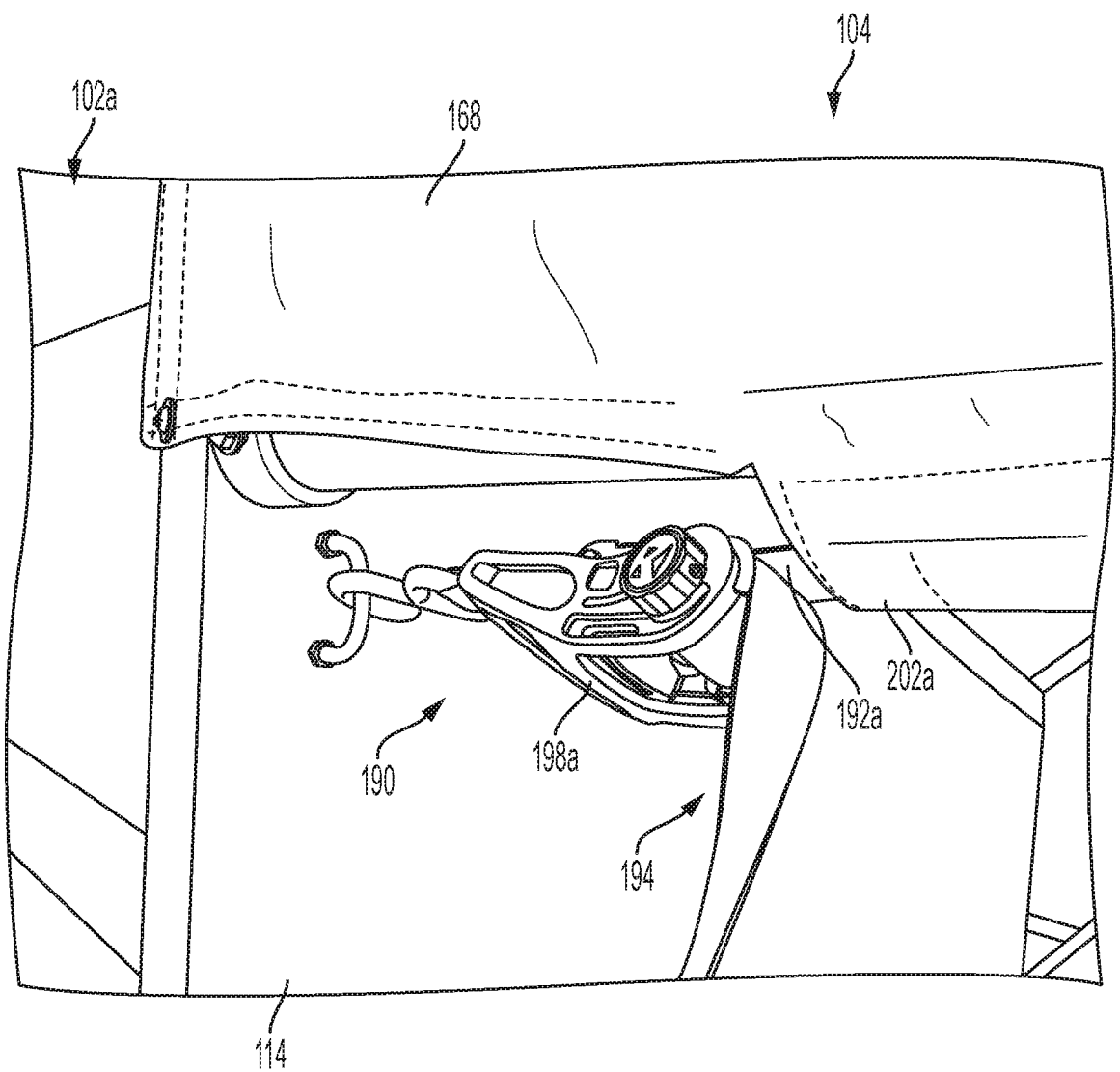
FIG. 21 is a perspective view of an illustrative right tensioning member on the rear right side of the nose assembly of FIG. 15.
Figure 22:
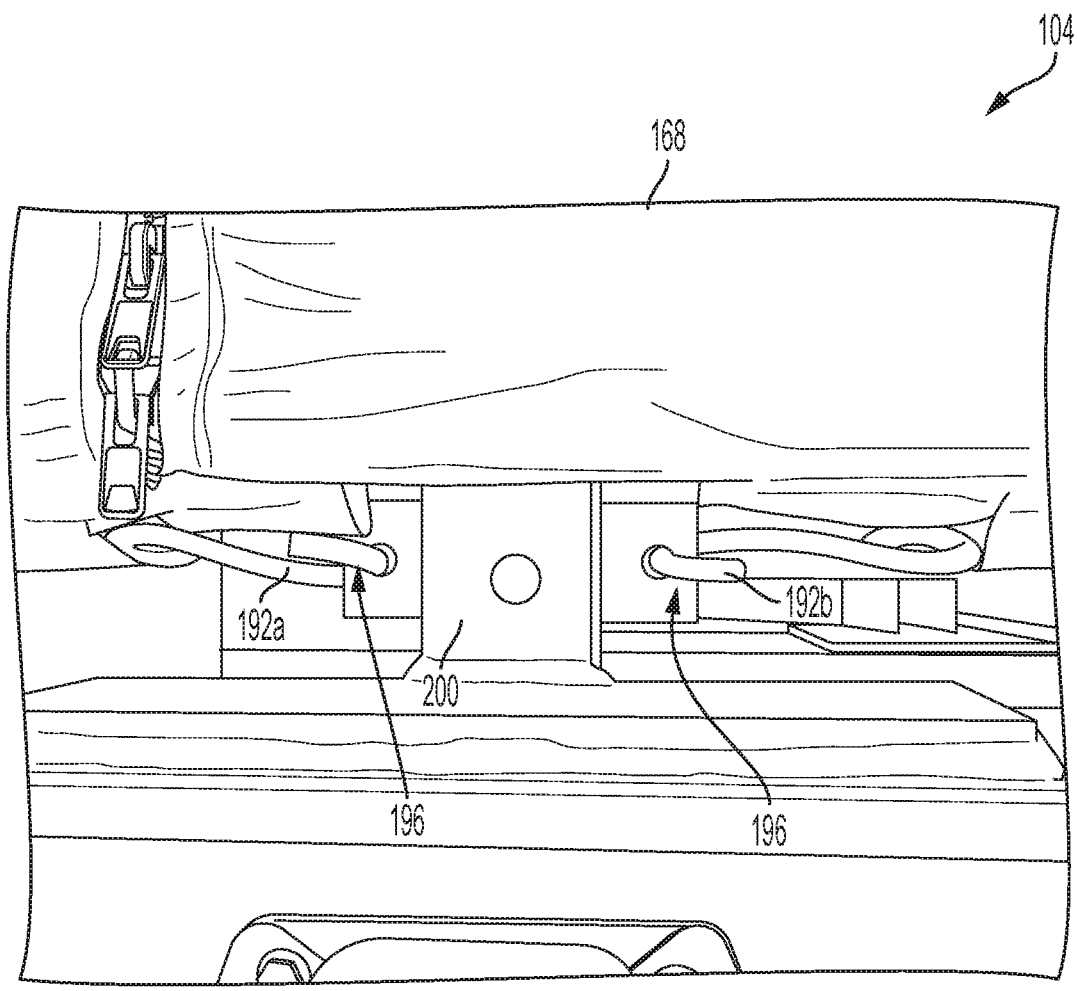
FIG. 22 is an illustrative center connector between right and left tensioning members.
Figure 23:
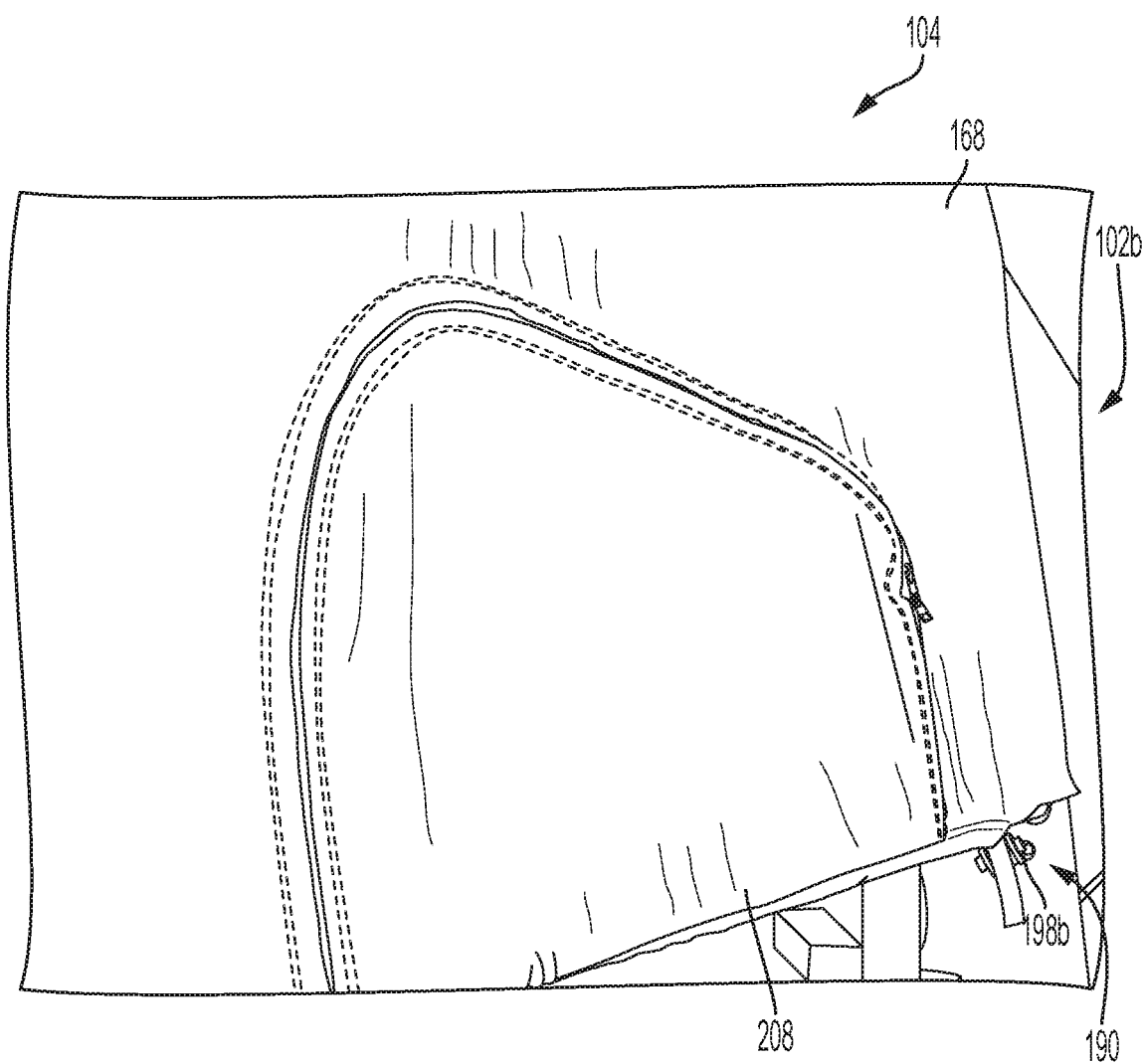
FIG. 23 is a perspective view of the left side of the nose assembly of FIG. 15.

With further reference to FIGS. 4, 6 and 15, the front nose assembly 104 further includes an upper panel or deflector screen 220 coupled to the front support structure 166 to prevent air from dropping below the front air deflector screen 168 and impacting the front end of the tank. A cross-member 222 secures a rear end of the upper panel 220 to the upper support member 170a. A front end of the upper panel 220 is secured (e.g., via stitching) to the upper portion of the front air deflector screen 168. The front air deflector screen 168 and the upper panel 220 may be formed of conventional tarp material, such as polyvinyl chloride (PVC).

Figure 33:
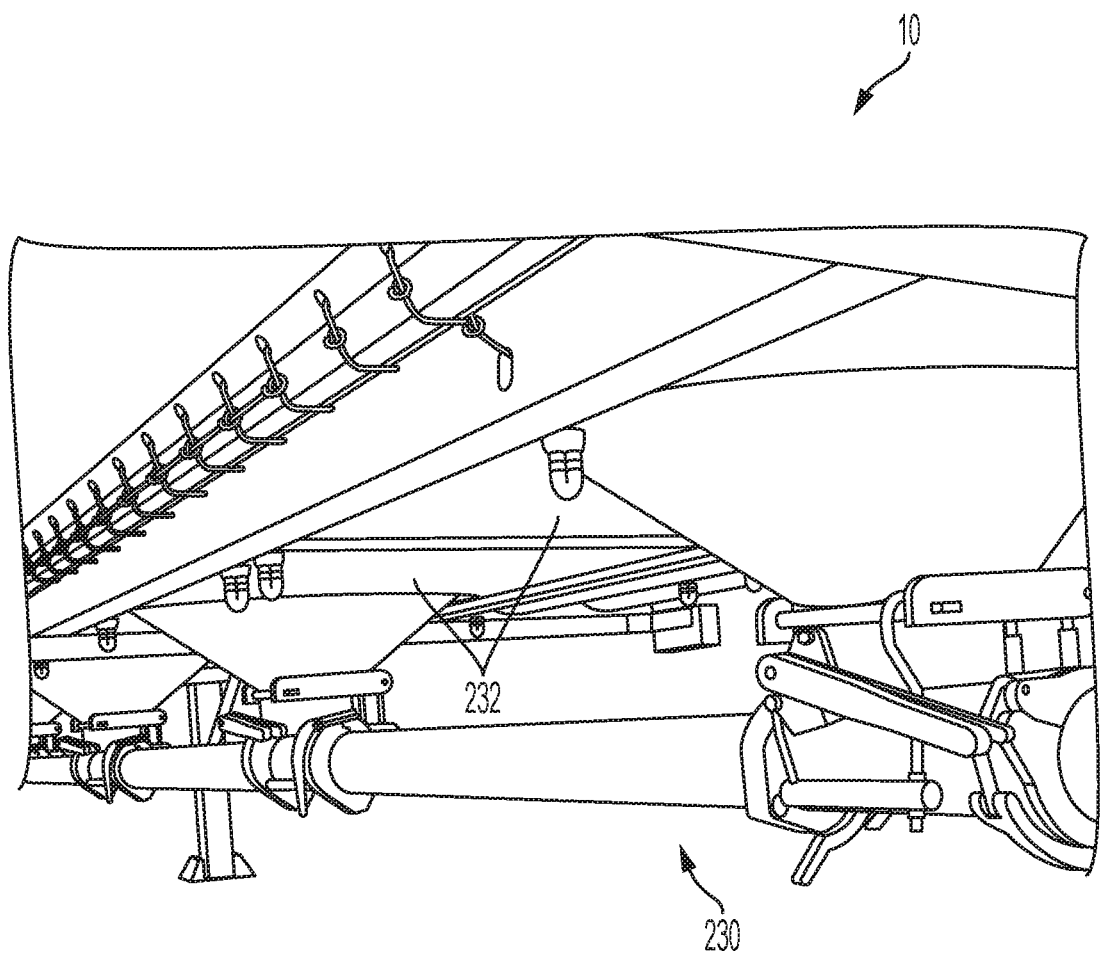
FIG. 33 is a bottom perspective view of the tank trailer and aerodynamic curtain of FIG. 2.
Figure 34:
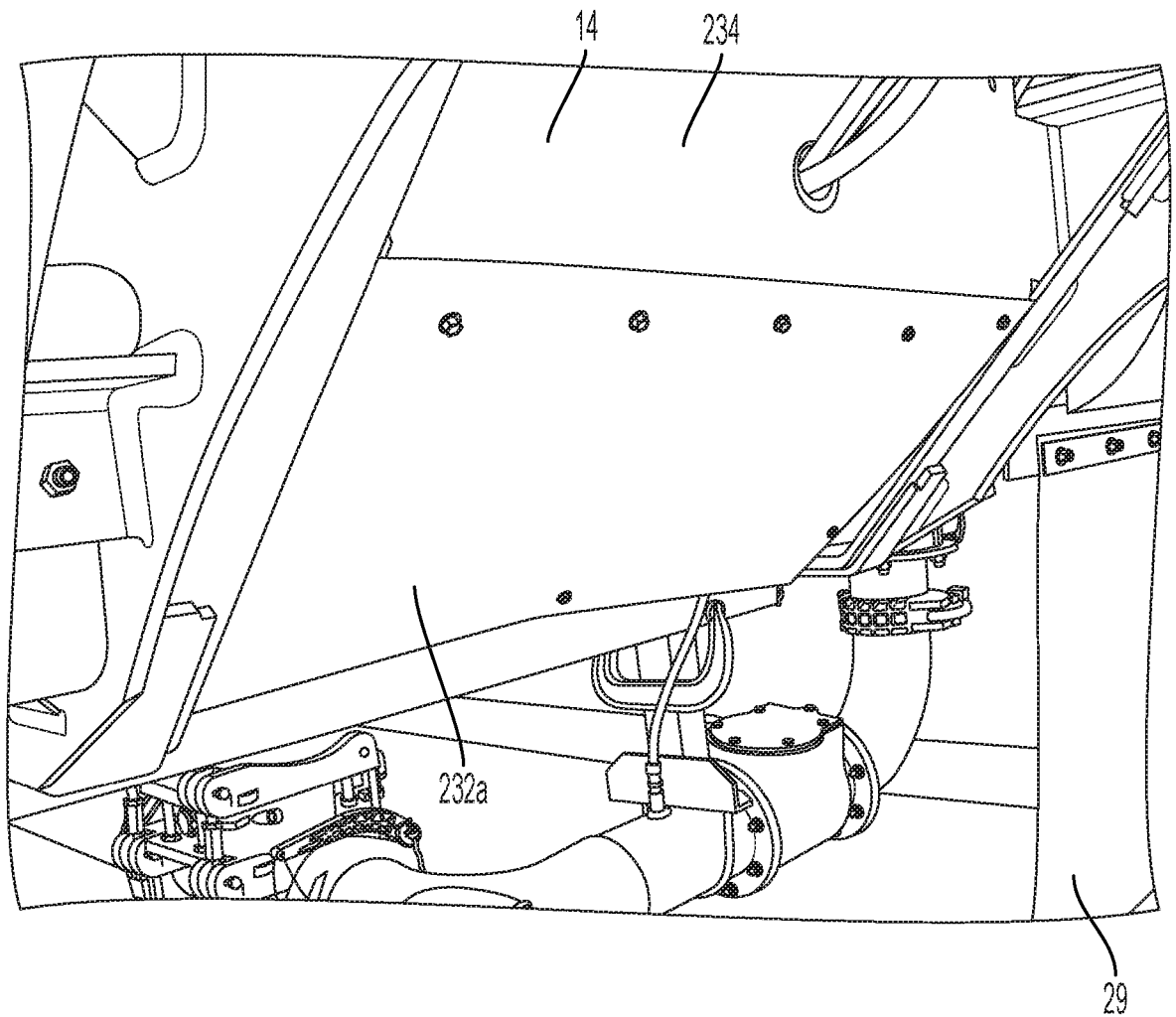
FIG. 34 is a perspective view of an illustrative air deflecting panel coupled to a front portion of the tank trailer of FIG. 2.

With reference to FIGS. 33 and 34, a lower air deflector assembly 230 is illustratively supported by a bottom portion of the tank trailer 10. More particularly, the lower air deflector assembly 230 illustratively includes a plurality of aerodynamic panels 232 coupled to the frame 14 on the underbody of the tank trailer 10. One such panel 232a is coupled to a leading portion 234 of the frame 14 (FIG. 34).

More particularly, panel 232a is illustratively supported laterally intermediate the mud flaps 29, and behind the front wheel assembly defined by the pulling vehicle. The panel 232a is illustratively angled from vertical to assist in deflecting air away from the components supported under the frame 14. In one illustrative embodiment, each panel 232 is illustratively formed of translucent Kemlite, available from Crane Composites Inc. of Channahon, Ill.

Figure 35:
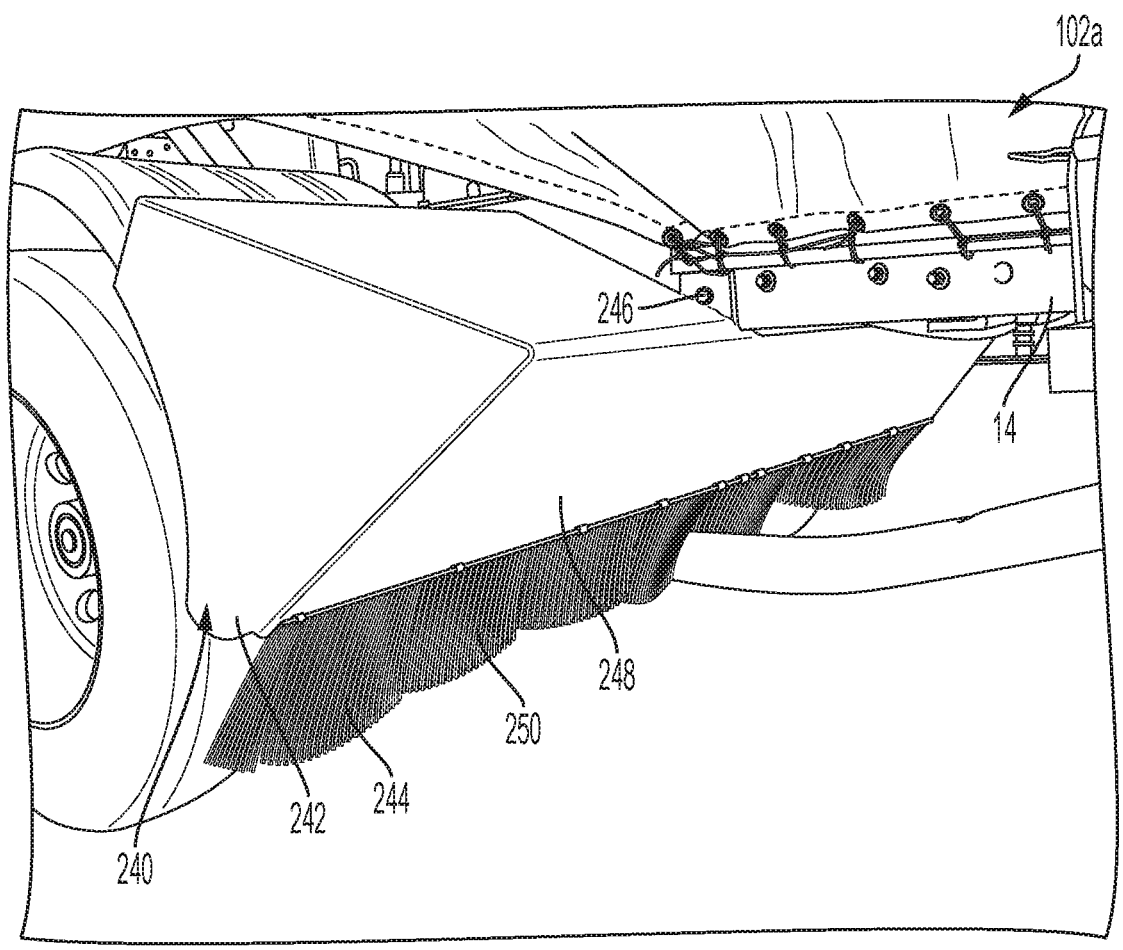
FIG. 35 is a left perspective view of an illustrative rear air deflector coupled to the rear wheel assembly of the tank trailer of FIG. 2.
Figure 36:
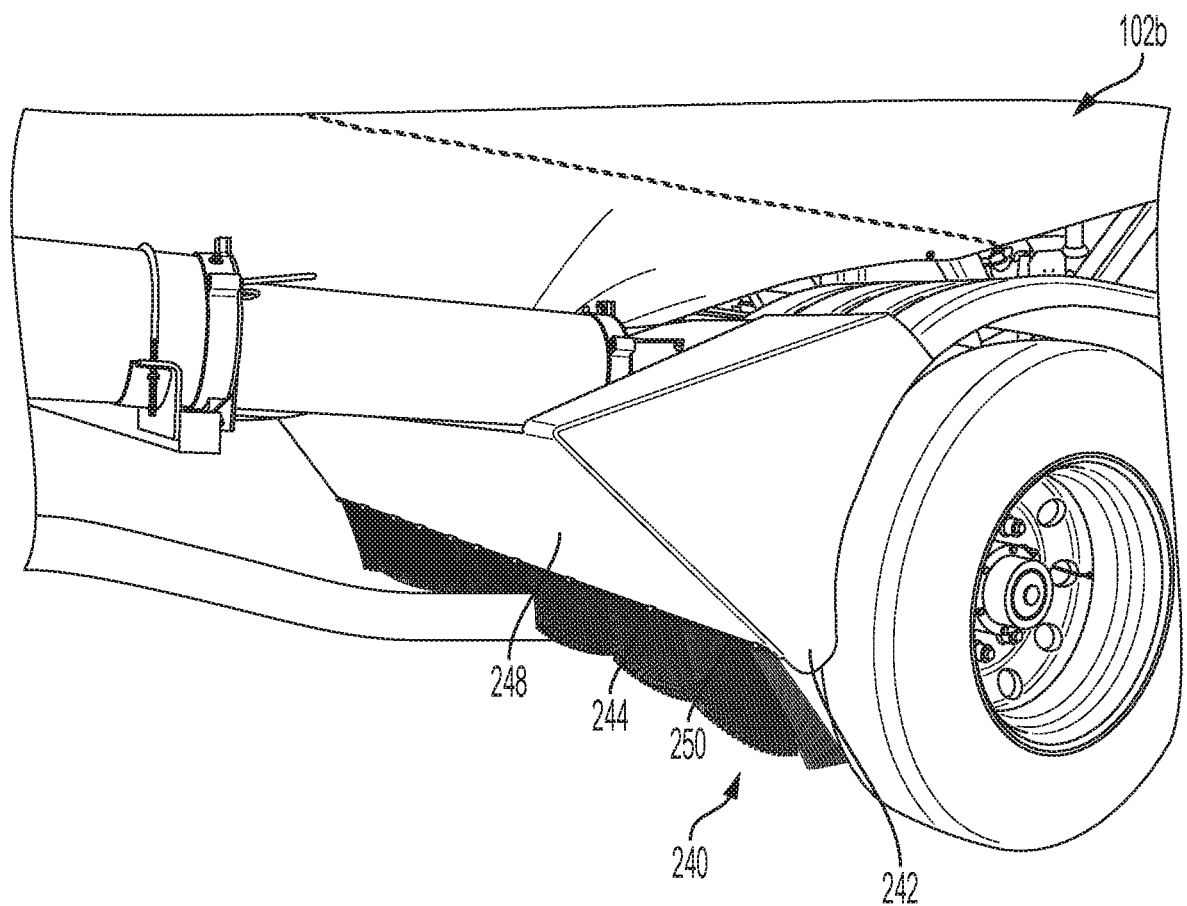
FIG. 36 is a right perspective view of the rear air deflector of FIG. 35.

Referring now to FIGS. 3, 35 and 36, a rear wheel aerodynamic assembly 240 is illustratively supported by a rear end of the rear suspension 20. The rear wheel aerodynamic assembly 240 includes a body 242 and a splash guard 244. The body 242 is illustratively coupled to the frame 14 via conventional fasteners, such as bolts 246, and includes an angled deflector shield 248. The body 242 is illustratively formed of a durable, light weight material, such as aluminum. The splash guard 244 illustratively comprises a plurality of downwardly extending bristles 250 (e.g., nylon).

Although the invention has been described in detail with reference to certain preferred embodiments, variations and modifications exist within the spirit and scope of the invention as described and defined in the following claims.

The invention claimed is:

1. An aerodynamic curtain assembly for a tank trailer comprising:
   a front nose assembly including a front support coupled to a tank trailer, and a flexible front air deflector screen coupled to the front support and extending arcuately from a first upright supported by a first side of the tank trailer to a second upright supported by a second side of the tank trailer;
   a first side assembly supported adjacent the first side of the tank trailer; and
   a second side assembly supported adjacent the second side of the tank trailer;
   wherein the first side assembly and the second side assembly each includes:
      an upper support member extending longitudinally along one of the first side and the second side of the tank trailer,
      a lower support member extending longitudinally along the one of the first side and the second side of the tank trailer below the upper support member,
      a flexible side air deflector screen including an upper end and a lower end,
      an upper coupler securing the upper end of the flexible side air deflector screen to the upper support member, and
      a lower coupler securing the lower end of the flexible side air deflector screen to the lower support member.

2. The aerodynamic curtain assembly of claim 1, further comprising a tail support coupled to the first side assembly and the second side assembly, the tail support including a first tail frame and a second tail frame laterally spaced apart from the first tail frame, the first tail frame supporting a rear end of the flexible side air deflector of the first side assembly, and the second tail frame supporting a rear end of the flexible side air deflector of the second side assembly.

3. The aerodynamic curtain assembly of claim 2, wherein each of the first tail frame and the second tail frame includes an upper longitudinal support member, a lower longitudinal support member, an intermediate longitudinal support member positioned between the upper longitudinal support member and the lower longitudinal support member, and fasteners securing the flexible side air deflector screen to the upper longitudinal support member, the lower longitudinal support member, and the intermediate longitudinal support member.

4. The aerodynamic curtain assembly of claim 1, wherein the upper coupler comprises a plurality of spring clips clamping the upper end of the flexible side air deflector screen to the upper support member.

5. The aerodynamic curtain assembly of claim 1, wherein the lower coupler comprises a cord passing through eyelets in the flexible side air deflector screen to secure the lower end of the flexible side air deflector screen to the lower support member.

6. The aerodynamic curtain assembly of claim 1, wherein the front support of the front nose assembly includes a plurality of horizontally spaced arcuate support members having opposing ends coupled to receiving openings supported by first and second weldments coupled to the first and second sides of the tank trailer.

7. The aerodynamic curtain assembly of claim 1, wherein the flexible front air deflector screen of the front nose assembly includes an access opening with a closable flap.

8. The aerodynamic curtain assembly of claim 1, wherein the front nose assembly further includes a tensioning member extending horizontally to provide tension in the lower end of the flexible front air deflector screen.

9. The aerodynamic curtain assembly of claim 8, wherein the tensioning member includes a strap and a tensioning buckle operably coupled to the strap.

10. The aerodynamic curtain assembly of claim 1, wherein the front nose assembly further includes an upper panel supported by the front support.

11. The aerodynamic curtain assembly of claim 1, further comprising an aerodynamic panel coupled to an underbody of the tank trailer, wherein the aerodynamic panel is coupled to the front end of the tank trailer behind a front wheel assembly defined by a pulling vehicle.

12. The aerodynamic curtain assembly of claim 1, further comprising a rear wheel aerodynamic assembly supported by a proximal end of a rear wheel assembly.

13. The aerodynamic curtain assembly of claim 12, wherein the rear wheel aerodynamic assembly includes a body and a splash guard operably coupled to the body.

14. An aerodynamic curtain assembly for a tank trailer comprising:
a first side assembly supported adjacent a first side of a tank trailer; and
a second side assembly supported adjacent a second side of the tank trailer;
wherein the first side assembly and the second side assembly each includes:
an upper support member extending longitudinally along one of the first side and the second side of the tank trailer,
a lower support member extending longitudinally along the first side of the tank trailer below the upper support member,
a flexible side air deflector screen including an upper end and a lower end,
an upper coupler securing the upper end of the flexible side air deflector screen to the upper support member,
a lower coupler securing the lower end of the flexible side air deflector screen to the lower support member, and
a tail support coupled to the first side assembly and the second side assembly, the tail support including a first tail frame and a second tail frame laterally spaced apart from the first tail frame, the first tail frame supporting a rear end of the flexible side air deflector of the first side assembly, and the second tail frame supporting a rear end of the flexible side air deflector of the second side assembly.

15. The aerodynamic curtain assembly of claim 14, wherein each tail support includes an upper longitudinal support member, a lower longitudinal support member, an intermediate longitudinal support member positioned between the upper longitudinal support member and the lower longitudinal support member, and fasteners securing the flexible side air deflector screen to the upper longitudinal support member, the lower longitudinal support member, and the intermediate longitudinal support member.

16. The aerodynamic curtain assembly of claim 14, further comprising a front nose assembly including a front support coupled to the tank trailer, and a flexible front air deflector screen coupled to the support and extending arcuately from a first upright supported by a first side of the tank trailer to a second upright supported by a second side of the tank trailer.

17. The aerodynamic curtain assembly of claim 16, wherein the front support of the front nose assembly includes a plurality of horizontally spaced arcuate support members having opposing ends coupled to receiving openings supported by first and second weldments coupled to the first and second sides of the tank trailer.

18. The aerodynamic curtain assembly of claim 16, wherein the flexible front air deflector screen of the front nose assembly includes an access opening with a closable flap.

19. The aerodynamic curtain assembly of claim 16, wherein the front nose assembly further includes a tensioning member extending horizontally to provide tension in the lower end of the flexible front air deflector screen.

20. The aerodynamic curtain assembly of claim 19, wherein the tensioning member includes a strap and a tensioning buckle operably coupled to the strap.

21. The aerodynamic curtain assembly of claim 16, wherein the front nose assembly further includes an upper panel supported by the front support.

22. The aerodynamic curtain assembly of claim 14, wherein the upper coupler comprises a plurality of spring clips clamping the upper end of the flexible side air deflector screen to the upper support member.

23. The aerodynamic curtain assembly of claim 14, wherein the lower coupler comprises a cord passing through eyelets in the flexible side air deflector screen to secure the lower end of the flexible side air deflector screen to the lower support member.

24. The aerodynamic curtain assembly of claim 14, further comprising an aerodynamic panel coupled to an underbody of the tank trailer, wherein the aerodynamic panel is coupled to the front end of the tank trailer behind a front wheel assembly defined by a pulling vehicle.

25. The aerodynamic curtain assembly of claim 14, further comprising a rear wheel aerodynamic assembly supported by a proximal end of a rear wheel assembly.

26. The aerodynamic curtain assembly of claim 25, wherein the rear wheel aerodynamic assembly includes a body and a splash guard.

27. A tank trailer comprising:
a frame extending longitudinally between a front end and a rear end;
a tank supported by the frame, the tank including a first side and a second side;
a plurality of valves supported by the frame below the tank;
an inlet supported proximate the front end of the frame; and
an aerodynamic curtain assembly including:
a front nose assembly including a front support coupled to the tank trailer, and a flexible front air deflector screen coupled to the support and extending arcuately from a first upright supported by a first side of the tank trailer to a second upright supported by a second side of the tank trailer, the inlet positioned intermediate the front nose assembly and the tank;

a first side assembly supported adjacent the first side of the tank trailer; and a second side assembly supported adjacent the second side of the tank trailer;

wherein the first side assembly and the second side assembly each includes:
  a longitudinally extending upper support member, and a longitudinally extending lower support member positioned below the upper support member,
  a flexible side air deflector screen including an upper end and a lower end,
  an upper coupler securing the upper end of the flexible side air deflector screen to the upper support member, and
  a lower coupler securing the lower end of the flexible side air deflector screen to the lower support member.

28. The tank trailer of claim 27, further comprising:
a rear wheel assembly operably coupled to the frame; and
a rear wheel aerodynamic assembly supported by a proximal end of the rear wheel assembly.

29. The tank trailer of claim 27, wherein the rear wheel aerodynamic assembly includes a body and a splash guard.

30. The tank trailer of claim 27, further comprising:
a vacuum loading filter supported by the frame; and
wherein the first side assembly and the second side assembly each further include a tail support coupled to the first side assembly and the second side assembly, the tail support including a first tail frame and a second tail frame laterally spaced apart from the first tail frame, the first tail frame supporting a rear end of the flexible side air deflector of the first side assembly, and the second tail frame supporting a rear end of the flexible side air deflector of the second side assembly, the vacuum loading filter positioned intermediate the first tail frame and the second tail frame.

31. The tank trailer of claim 30, wherein each of the first tail frame and the second tail frame includes an upper longitudinal support member, a lower longitudinal support member, an intermediate longitudinal support member positioned between the upper longitudinal support member and the lower longitudinal support member, and fasteners securing the flexible side air deflector screen to the upper longitudinal support member, the lower longitudinal support member, and the intermediate longitudinal support member.

32. The tank trailer of claim 27, wherein the upper coupler comprises a plurality of spring clips clamping the upper end of the flexible side air deflector screen to the upper support member.

33. The tank trailer of claim 27, wherein the lower coupler comprises a cord passing through eyelets in the flexible side air deflector screen to secure the lower end of the flexible side air deflector screen to the lower support member.

34. The tank trailer of claim 27, wherein the front support of the front nose assembly includes a plurality of horizontally spaced arcuate support members having opposing ends coupled to receiving openings supported by first and second weldments coupled to the first and second sides of the tank trailer.

35. The tank trailer of claim 27, wherein the flexible front air deflector screen of the front nose assembly includes an access opening with a closable flap for providing access to the inlet.

36. The tank trailer of claim 27, wherein the front nose assembly further includes a tensioning member extending horizontally to provide tension in the lower end of the flexible front air deflector screen.

37. The tank trailer of claim 36, wherein the tensioning member includes a strap and a tensioning buckle coupled to the strap.

38. The tank trailer of claim 27, wherein the front nose assembly further includes an upper panel supported by the front support.

39. The tank trailer of claim 27, further comprising an aerodynamic panel coupled to an underbody of the tank trailer, wherein the aerodynamic panel is coupled to the front end of the tank trailer behind a front wheel assembly defined by a pulling vehicle.

* * * * *